(12) United States Patent
Barker et al.

(10) Patent No.: US 8,405,485 B2
(45) Date of Patent: Mar. 26, 2013

(54) APPARATUS, METHOD, AND SYSTEM FOR IDENTIFICATION OF MULTIPLE POINTS LOCATED THROUGHOUT AN AREA

(75) Inventors: David L. Barker, Ottumwa, IA (US); Lowell J. Ware, Oskaloosa, IA (US)

(73) Assignee: Musco Corporation, Oskaloosa, IA (US)

( * ) Notice: Subject to any disclaimer, the term of this patent is extended or adjusted under 35 U.S.C. 154(b) by 619 days.

(21) Appl. No.: 12/603,060

(22) Filed: Oct. 21, 2009

(65) Prior Publication Data

US 2011/0090051 A1 Apr. 21, 2011

(51) Int. Cl.
 *G08B 25/00* (2006.01)
(52) U.S. Cl. ....................................... 340/8.1
(58) Field of Classification Search .................. 340/8.1; 356/3.01, 3.02, 3.16, 138
See application file for complete search history.

(56) References Cited

U.S. PATENT DOCUMENTS

| | | | |
|---|---|---|---|
| 4,836,669 A | 6/1989 | Teach | |
| 5,035,064 A * | 7/1991 | Care | 33/760 |
| 5,685,636 A | 11/1997 | German | |
| 6,390,626 B2 | 5/2002 | Knox | |
| 6,453,568 B1 * | 9/2002 | Hymer | 33/276 |
| 6,502,319 B1 | 1/2003 | Goodrich et al. | |
| 6,735,879 B2 | 5/2004 | Malard et al. | |
| 7,137,207 B2 | 11/2006 | Armstrong et al. | |
| 7,216,437 B2 | 5/2007 | Gordin et al. | |
| 7,269,907 B2 | 9/2007 | Levine et al. | |
| 7,345,748 B2 | 3/2008 | Sugiura et al. | |
| 7,434,322 B2 | 10/2008 | Walser et al. | |
| 7,500,764 B2 | 3/2009 | Gordin | |
| 7,665,223 B2 * | 2/2010 | Swanson et al. | 33/756 |
| 7,874,055 B2 | 1/2011 | Stone | |
| 7,918,586 B2 | 4/2011 | Gordin | |
| 7,979,993 B2 | 7/2011 | Tippett et al. | |
| 8,006,394 B2 | 8/2011 | Tippett et al. | |
| 8,104,094 B2 | 1/2012 | Uttrachi | |
| 2006/0196059 A1 | 9/2006 | Berto | |

* cited by examiner

*Primary Examiner* — Vernal Brown
(74) *Attorney, Agent, or Firm* — McKee, Voorhees & Sease, P.L.C.

(57) ABSTRACT

Apparatus, methods, and systems for determining point locations with respect to an origin point. Aspects provide for a cost-effective and easy to use way in which a limited number of persons may map out point locations over a relatively large area with a high degree of accuracy.

15 Claims, 17 Drawing Sheets

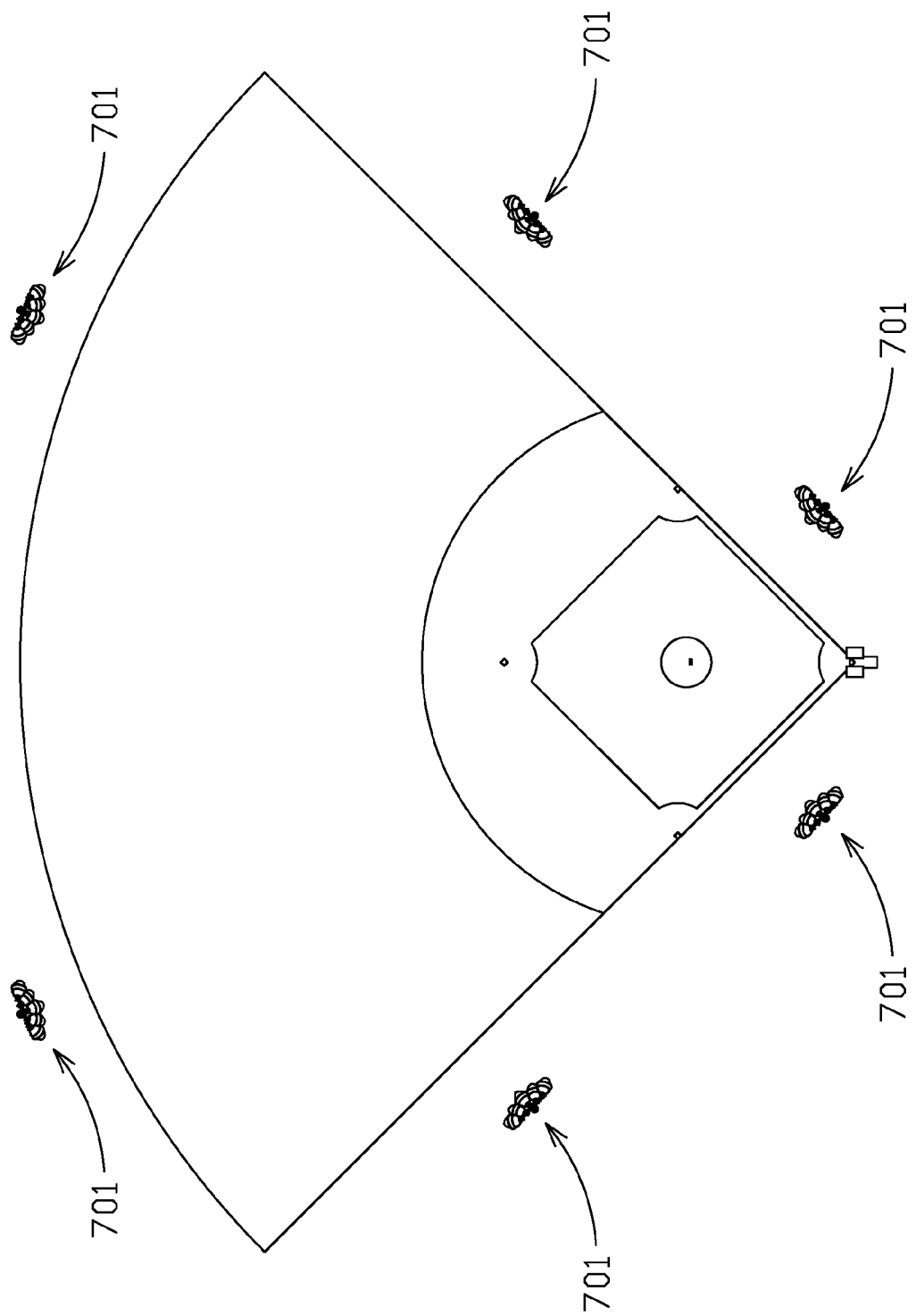

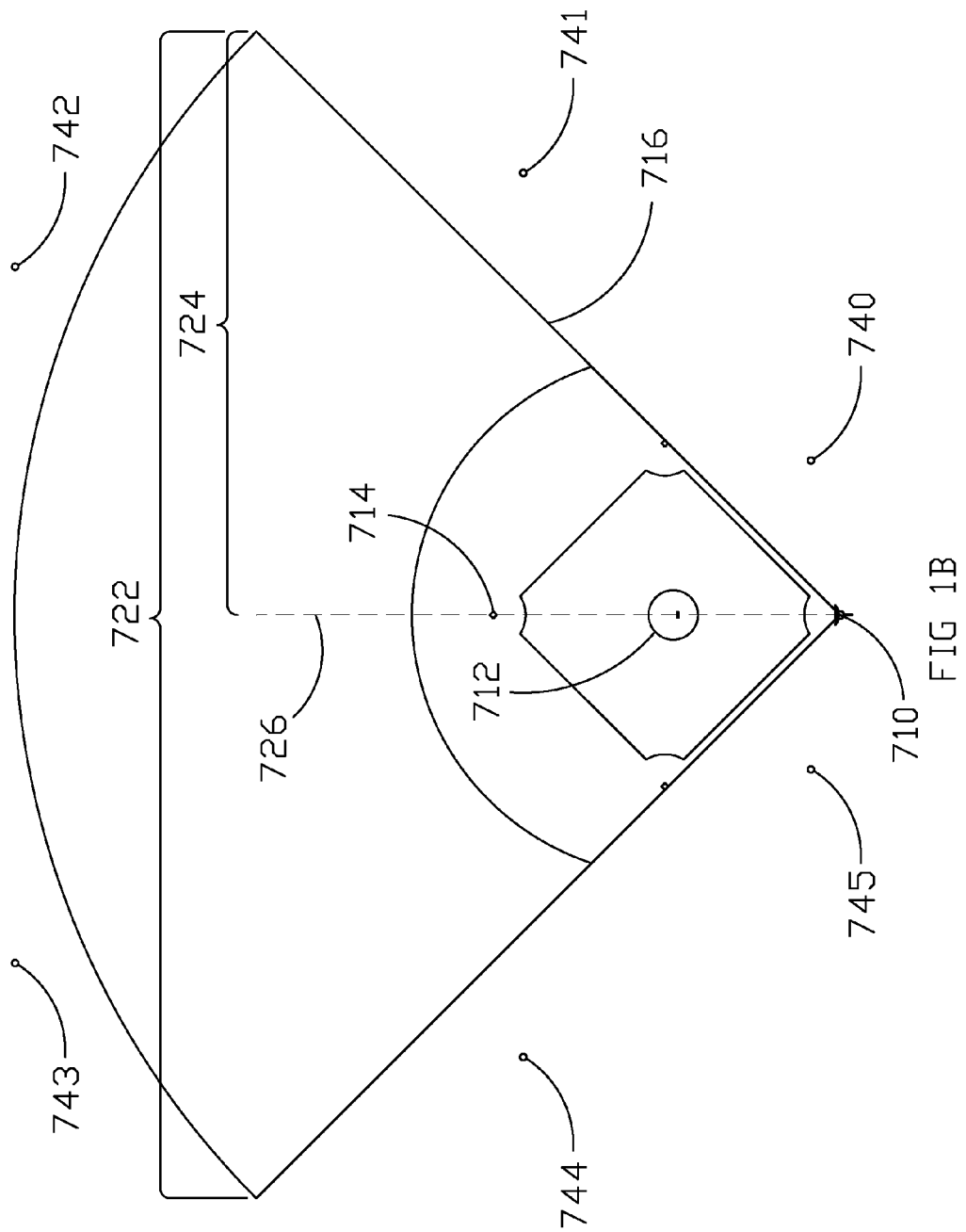

FIG 4A-C

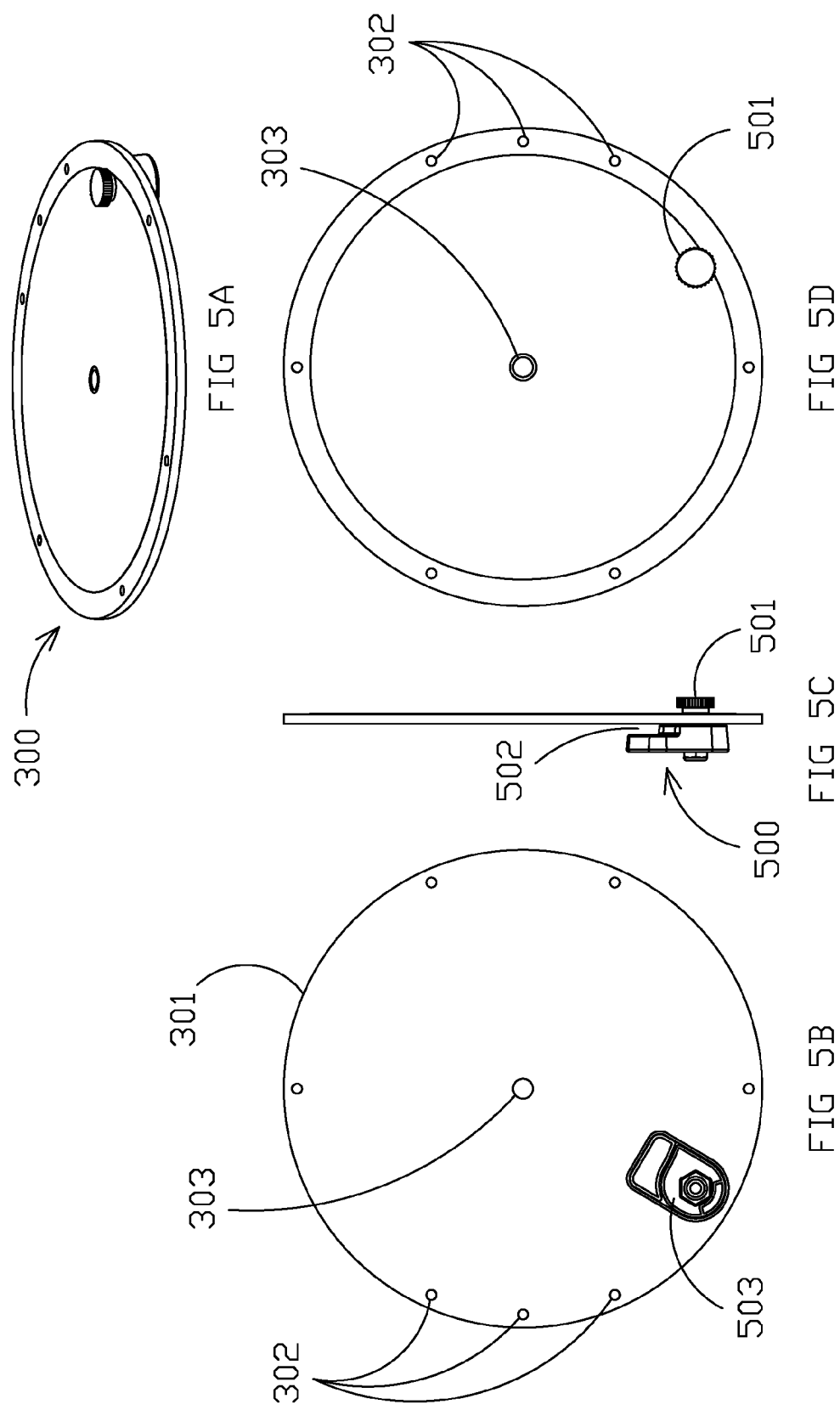

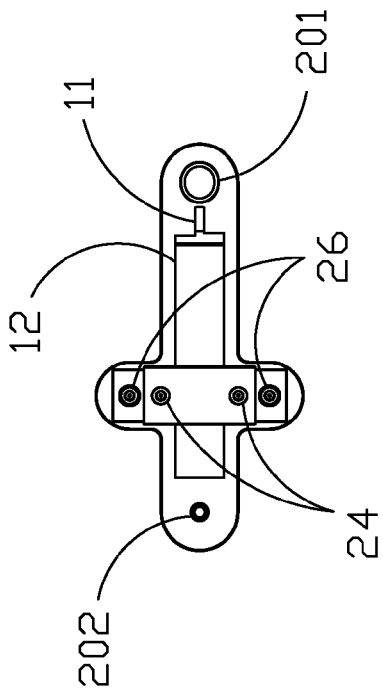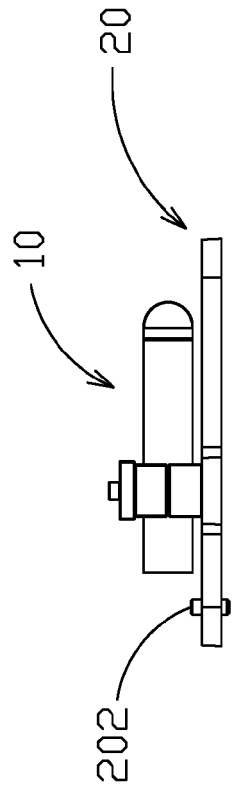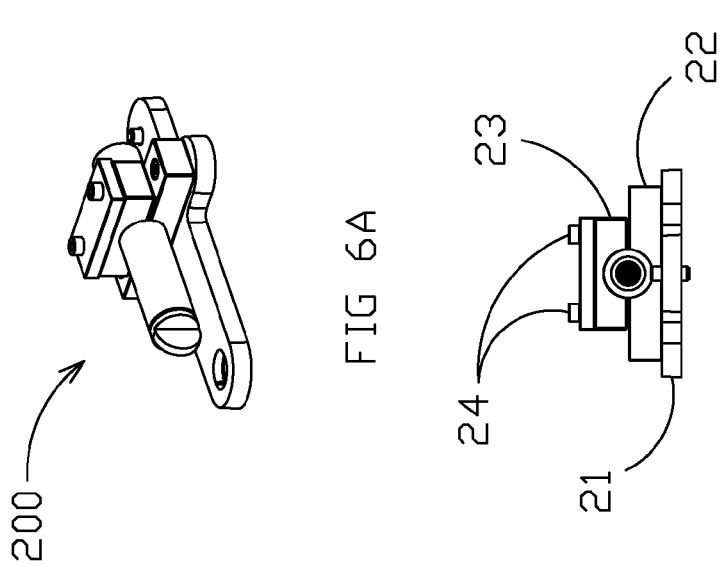
FIG 6A-D

APPARATUS, METHOD, AND SYSTEM FOR IDENTIFICATION OF MULTIPLE POINTS LOCATED THROUGHOUT AN AREA

I. BACKGROUND OF INVENTION

The present invention relates to determining specific geographic locations with respect to a centralized location. More specifically, the present invention relates to apparatus and methods by which a person or persons may quickly, and with sufficient accuracy, determine specific geographic locations within a relatively large area in a cost-effective and sufficiently accurate and efficient manner.

A variety of applications require accurate determination of point locations within a large area; one example is the locating of corner points for a property border. In the art of wide area lighting, one example is determining the location of support structures (many times poles) relative to an area of interest (e.g. sports field, parking lot). A primary concern is how to accurately map out point locations (e.g. within a certain distance and/or angular displacement tolerance) in a cost-efficient manner (e.g. with a limited number of persons utilizing economically viable equipment).

One way points are located over a large area is via use of tape measure. Open reel steel tape measures (e.g. model OTRS1810300E available from Keson Industries, Aurora, Ill., U.S.) may extend substantial distances, are portable, and are inexpensive. However, it is difficult to accurately map out an area using tape measures. Using again the example wide area lighting, assume a person is standing at an actual reference or location or what may also be called an origin point (e.g. home plate on a baseball field) and needs to measure out a distance both north and west of the origin point to place a pole. The tape measure must somehow be secured at the origin point (e.g. via stake or a second person holding the tape measure), stretched a certain distance north, that point marked, the tape measure moved to said point and staked (or otherwise secured), and then stretched a certain distance west. However, it is often unclear if the tape measure has been stretched in a straight line; user perception, wind conditions, and topography are a few factors that may affect the alignment of a tape measure. Thus, in this example, if the tape measure is misaligned as it is stretched north, the misalignment may be exacerbated as it is stretched west.

One attempted solution is to use multiple persons with multiple tapes measures, along with geometric principles and distinguishable site location features (e.g. foul line, second base), to ensure all lines are straight along the ground. As may be appreciated, however, this requires multiple trained personnel and is relatively slow. Additionally, limiting factors such as wind and other conditions still apply. Still further, if the area of interest (e.g. sports field, parking lot) is newly developed, distinguishing features (e.g. bases, parking stall lines) may not be available for reference.

While some of the aforementioned less complex methods to locate points over a large area in the current state of the art may be adequate for some applications, other applications may benefit from a higher degree of accuracy. For example, in the art of sports lighting, computer programs are often used to produce illumination summaries which detail precise pole locations about a field such that pre-aimed fixtures attached to said poles achieve a specified illumination level and light uniformity level on the field. Misalignment of even a single pole by several feet or more may diminish illumination and light uniformity levels beyond what is acceptable by governing codes.

One example of a high accuracy method of determining point locations over a large area is via use of land survey equipment such as laser transits (e.g. model DW092PK available from DeWALT Industrial Tool Company, Baltimore, Md., U.S.). While accurate, land survey equipment is generally costly, requires specially trained personnel to operate it, is relatively slow to operate, and requires regular calibration. An alternative method is to use handheld geographic position or location devices. While the ease of use and portability of such devices has increased in recent years, the cost and time required for operation remains high for applications requiring locating multiple points over a large area with a high degree of accuracy. Still another alternative is to use range finders (e.g. model TruPulse 200 available from Laser Technology, Inc., Centennial, Colo., U.S.) which are generally portable and quick to operate, but are also costly and are most useful when determining a distance or height from an origin to a known object (thus, useful to verify the distance from an origin point to an installed pole, but not particularly useful when verifying distance and direction from an origin or reference location to an unmarked location, as may be the case when installing the pole).

It may therefore be seen that apparatus and methods of determining point locations over a large area may benefit from improvements in ease of use, accuracy, speed of operation, cost-effectiveness, or any combination thereof.

II. SUMMARY OF INVENTION

The effectiveness of currently available apparatuses and methods by which one or multiple point locations may be mapped out over a relatively large area is limited by the cost-effectiveness, ease of use, and accuracy of said apparatus and methods, to name a few. It is therefore a principle object, feature, advantage, or aspect of the present invention to improve over the state of the art and/or address problems, issues, or deficiencies in the art.

Further objects, features, advantages, or aspects of the present invention may include one or more of the following:
a. means or methods of determining a point location or multiple point locations with respect to an origin point location for a relatively large area within an acceptable tolerance,
b. means or methods of measuring the distance to a point location or multiple point locations from an origin point location within an acceptable tolerance, and
c. a system or method of determining, within an acceptable tolerance, point location(s) and measuring the distance to said point location(s) such that:
 i. a person or persons may readily use the system or method with limited specialized training or instruction,
 ii. a person or persons may map out a plurality of point locations in a quick and accurate manner with limited resources, and
 iii. the system is adaptable to a variety of applications, areas of interest, and/or point locations.

A method according to at least one aspect of the present invention comprises translating one or more scale-model plan points each to a correlated actual geographic location in a relatively wide area by assigning on the plan a plan reference point and a plan radial reference direction related to the plan reference point. An actual reference location correlated to the plan reference point is located on the area, as is an actual radial reference direction correlated to the plan radial reference direction. An actual geographic location correlated to a plan point is located in the area by translating the scale-model offset of the plan point on the plan from the plan reference point and plan radial reference direction into an actual geographic location in the area. The actual location is determined by the offset in direction and distance from the actual reference location and projected actual radial reference direction. The method may be used for locating one location in the area or plural locations in the area. For plural locations, the same plan reference point, plan radial reference direction, actual reference location, and actual radial reference direction may be used. This allows a one-time set up of these references at the actual reference location, and a use of the scale-model plan to locate plural actual locations from that single reference location.

An apparatus according to one aspect of the present invention comprises a portable base, a working head, and a surface. The surface may be used as a reference surface which may be oriented relative to an area on which actual points are to be located based on a scale-model plan. The base may be positioned on an actual reference location in the area. The working head may be adjusted relative to the base to adjust orientation of the reference surface to the area. By positioning the base and orienting the reference surface of the apparatus, actual locations correlated to plan points may be located in the area by translating plan points related to the reference surface to actual geographic locations in the area.

One aspect according to the apparatus includes the scale-model plan physically displayed or mounted on the reference surface. The plan may then be oriented relative to the actual area in a reference orientation. The actual locations in the area correlating in direction and distance from the plan points may be found by measuring actual distance to each plan point as indicated in the plan along the corresponding direction indicated in the plan.

In one aspect the apparatus may be a relatively inexpensive, portable, self-contained system that may be carried by one person to virtually any area, quickly set up, and used for locating actual locations around a relatively large area within an acceptable range of accuracy relative to a predetermined scale-model plan. For example, the base may be a relatively inexpensive camera tripod. The reference surface may be an inexpensive plate mounted on the tripod. Determination of the direction to the actual locations may comprise relatively inexpensive optical components. One example is a hand-size, relatively inexpensive, relatively low-power laser pointer issuing a laser beam spread in essentially one plane. Another example may be a relatively inexpensive range-finder or rifle sight. Any of these may be mounted on the reference surface and the reference surface oriented relative to an actual reference direction correlated to a plan reference direction. The orientation may be to known actual landmarks in or at the area. The optical components may thus align the apparatus to a reference position within an acceptable range of tolerance. The optical components may then be repositioned on the reference surface commensurate with an offset in direction from the plan reference point to a plan point. This would automatically align the optical components in the direction towards the actual location to be located in the area. All that is left is to use geometric information in the plan to measure to the actual location in the area. The measurement may be with a relatively inexpensive measuring device; one example is a tape measure.

A method according to at least one aspect of the present invention comprises determining an origin point or plan reference point and a zero line or plan radial reference direction, translating such a point and direction to an actual location and direction at an area of interest, determining the angular displacement from the zero line to each actual point location via an envisioned apparatus by reference to a pre-determined plan, and measuring a distance along the line of angular displacement as projected out into the area to identify an actual point location relative to the origin point.

An apparatus according to at least one aspect of the present invention comprises a base assembly, a plate assembly affixed to the base assembly, and a laser aiming assembly affixed to the plate assembly. The plate assembly is customized such that alignment of the laser assembly with respect to the plate assembly ensures an accurate angular displacement from a zero line for each point location, as specified for a particular application.

One typical application may be a sports field requiring accurate placement of poles or other structures elevating pre-aimed fixtures such that correct placement of poles or other structures ensures adequate lighting of said field, but any area of interest which requires accurate determination of a point location or plurality of point locations may likewise benefit.

These and other objects, features, advantages, or aspects of the present invention will become more apparent with reference to the accompanying specification.

III. BRIEF DESCRIPTION OF THE DRAWINGS

From time-to-time in this description reference will be taken to the drawings which are identified by figure number and are summarized below.

FIGS. 1A-C diagrammatically illustrate a typical baseball field and one method of determining a point location on said field.

FIGS. 2A-C diagrammatically illustrate a typical football field and one method of determining a point location on said field.

FIGS. 3A and 3B illustrate an exemplary apparatus according to one or more aspects of the present invention. FIG. 3A is a perspective assembled view. FIG. 3B is perspective exploded view.

FIGS. 4A-D illustrate, in isolation, a base assembly according to the exemplary apparatus illustrated in FIGS. 3A and 3B. FIG. 4D is a perspective view. FIGS. 4A, 4B, and 4C are top plan, back elevation, and side elevation views, respectively of FIG. 4D.

FIGS. 5A-E illustrate, in isolation, a plate assembly according to the exemplary apparatus illustrated in FIGS. 3A and 3B. FIG. 5A is a perspective view. FIGS. 5B, 5C, and 5D are bottom plan, side edge plan, and top plan views, respectively of FIG. 5A. FIG. 5E is an enlarged top plan view with a scale-model plan added.

FIGS. 6A-D illustrate a laser aiming assembly according to the exemplary apparatus illustrated in FIGS. 3A and 3B. FIG. 6A is a perspective view. FIGS. 6B, 6C, and 6D are front elevation, top plan, and side elevation views, respectively of FIG. 6A.

FIGS. 7A and 7B illustrate an alternative exemplary apparatus according to aspects of the invention. FIG. 7A is a perspective assembled view with a scale-model plan that may be utilized with the apparatus also illustrated. FIG. 7B is an enlarged exploded view of the components that are mounted to the top of the base shown in FIG. 7A.

IV. DETAILED DESCRIPTION OF EXEMPLARY EMBODIMENTS

A. Overview

Figure 1C:
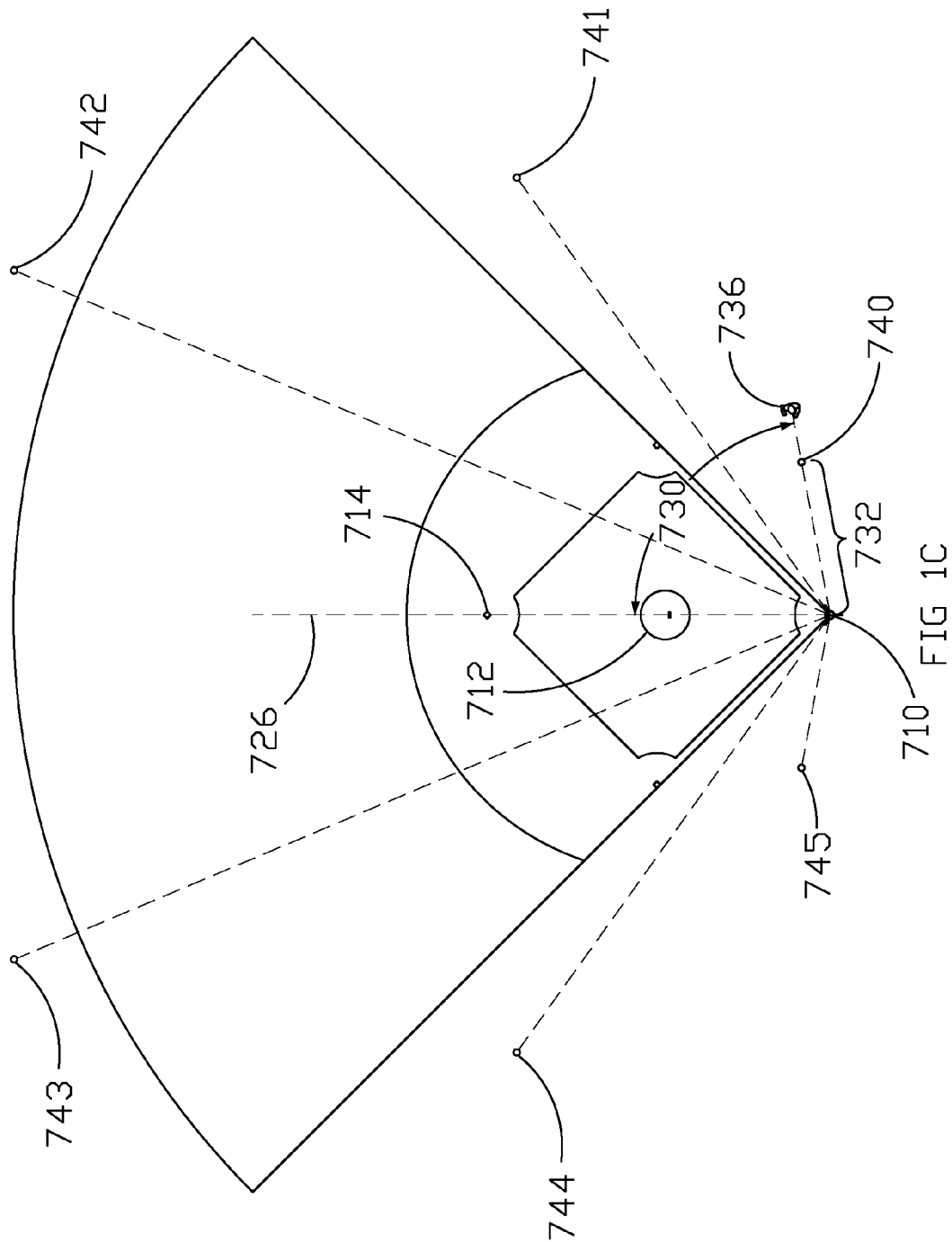

To further an understanding of the present invention, specific exemplary embodiments according to the present invention will be described in detail. Frequent mention will be made in this description to the drawings. Reference numbers will be used to indicate certain parts in the drawings. Unless otherwise stated, the same reference numbers will be used to indicate the same parts throughout the drawings.

Figure 5E:
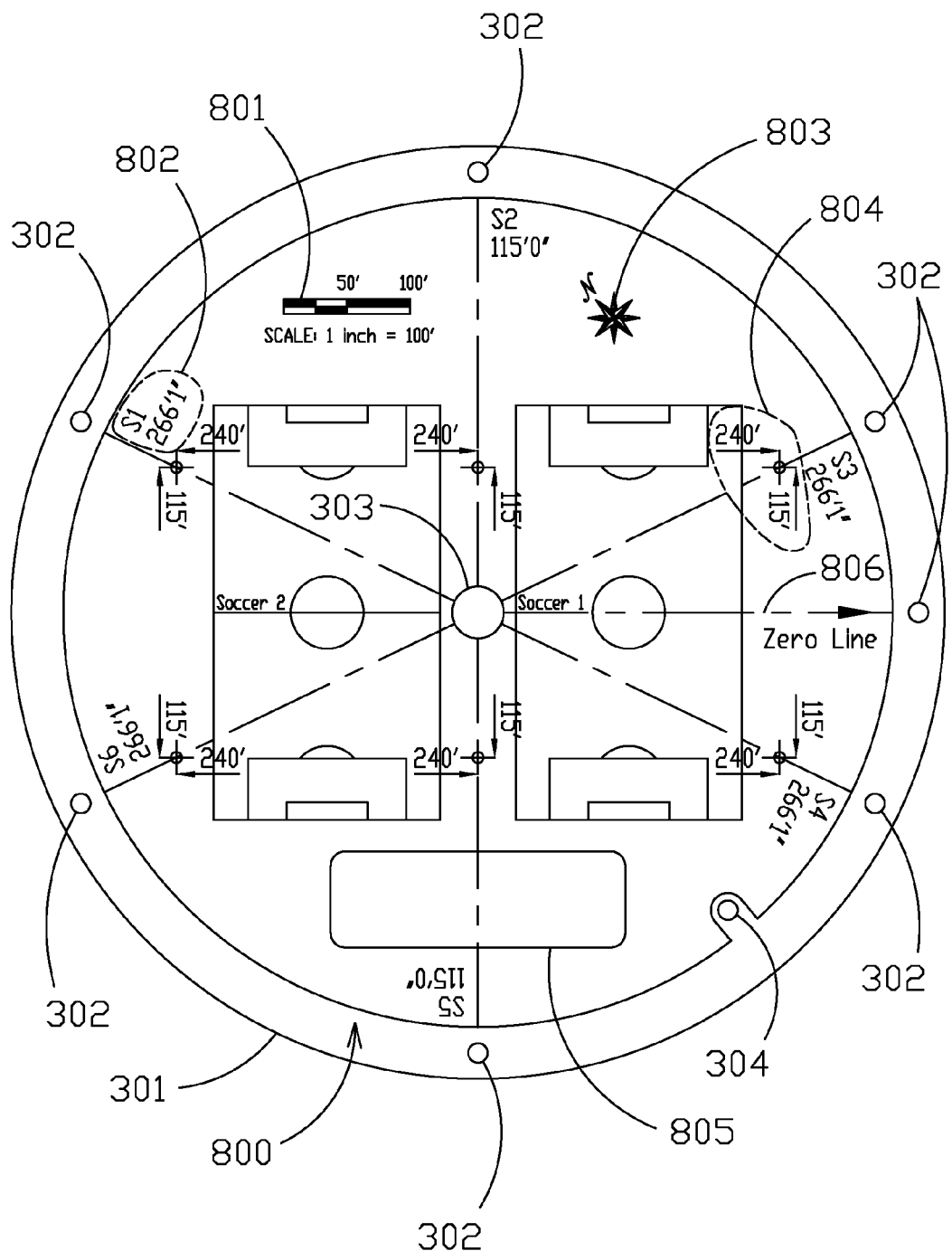

The exemplary embodiments envision a portable apparatus that is physically transported to and placed at an actual origin point and aligned along an actual zero line at a relatively large geographic area in which one or more actual locations are to be located. A visual layout or scale-model plan of the area of interest, clearly indicating the location of the origin point in the layout or plan, and the direction of the zero line in the layout or plan is provided—in one embodiment as a label affixed to some portion of the apparatus (e.g. see FIG. 5E) and in an alternative embodiment as a document (e.g. see FIG. 7A) to be used with the apparatus. By such alignment between the portable device and the actual area of interest, points of interest in the layout may be translated to actual locations in the large area quickly, economically, and with a degree of accuracy that is acceptable for the application.

In these exemplary embodiments and examples the term "origin point" sometimes will be alternatively referred to as a "reference point" or "reference location" and the term "zero line" sometimes alternatively referred to as a "reference direction". Additionally, there will be an origin point or reference point on the layout or plan, as well as one on the actual geographic area of interest. To distinguish between them, the former will sometimes be called "layout origin point" or "plan reference point" and the latter will sometimes be called "actual origin point" or "actual reference location".

There will also be a zero line or reference direction on the layout or plan, as well as relative to the actual geographic area of interest. To distinguish between them, the former will sometimes be called "layout zero line" or "plan radial reference direction" and the latter will sometimes be called "actual zero line" or "actual radial reference direction".

The term "specific geographic locations" may refer either to points of interest on the layout or the actual geographical area. To distinguish between those, the former will sometimes be called "specific layout points" or "plan points" and the latter sometimes called "actual geographic locations".

In these exemplary embodiments, the term "offset" will sometimes be used to refer to the difference, if any, between the "layout origin point" or "plan reference point" and a plan point, usually in terms in angular displacement and distance. It is to be understood that the offset may be indicated on the layout or plan by any of a number of ways. In a scale-model plan, it is directly proportional to actual intended distance and direction from the actual origin point, and may be derived by some indicia on the layout or plan indicating scale of the scale-model relative to the actual area. But the offset may be indicated by values (e.g. angular displacement value and distance value) or analogous geometric or mathematical relationships or descriptions. Also, the method by which one would translate the offset from the layout or plan to the actual area may vary. For example, a plan point may be translated to the actual area by using an offset characterized by (a) angular displacement from the layout zero line to a radial line from the layout origin point through a specific layout point (or between the plan reference point and plan radial direction through a plan point) in combination with (b) actual distance indicated on the layout or plan between the actual origin point or actual reference point on the area and the specific geographic location. For example, polar coordinates may be defined on the layout and map between (a) the origin or plan reference point and layout zero line or plan radial reference direction and (b) the direction and distance to a layout or plan point of interest, and then those polar coordinates translated to actual angular displacement and distance from actual origin point or actual reference point and actual zero line or plan radial reference to the specific geographic location. But as another example, geometric descriptions of offset between a layout origin point or plan reference point and a layout point or plan point of interest may be used; such as using a Cartesian translation of offset between layout origin point or plan reference point and point of interest on the layout or a plan point. Other geometric or arithmetic methods of translating from the layout or plan to the actual area based on the layout or plan are, of course, possible.

As an example, FIG. 1A illustrates a plan view of a typical actual baseball field with poles 701 spaced around the periphery, each pole 701 correlating to an actual point location in the area which includes the baseball field (see reference nos. 740-745) in FIG. 1B. Generally, an actual origin point 710 may be located at home plate and an actual zero line 726 run through actual origin point 710, pitcher's mound 712, and second base 714. To ensure placement of the actual zero line 726 beyond second base 714, a variety of methods may be employed; in this example distance 724 is determined given known distances 722 and 716. As may be seen from FIG. 1C, knowing the location of actual origin point 710 and actual zero line 726 permits calculation of the distances to actual point locations 740-745. In this example, a user 736 may determine actual point location 740 by measuring angular displacement 730 from actual zero line 726 and measuring distance 732.

Figure 2A:
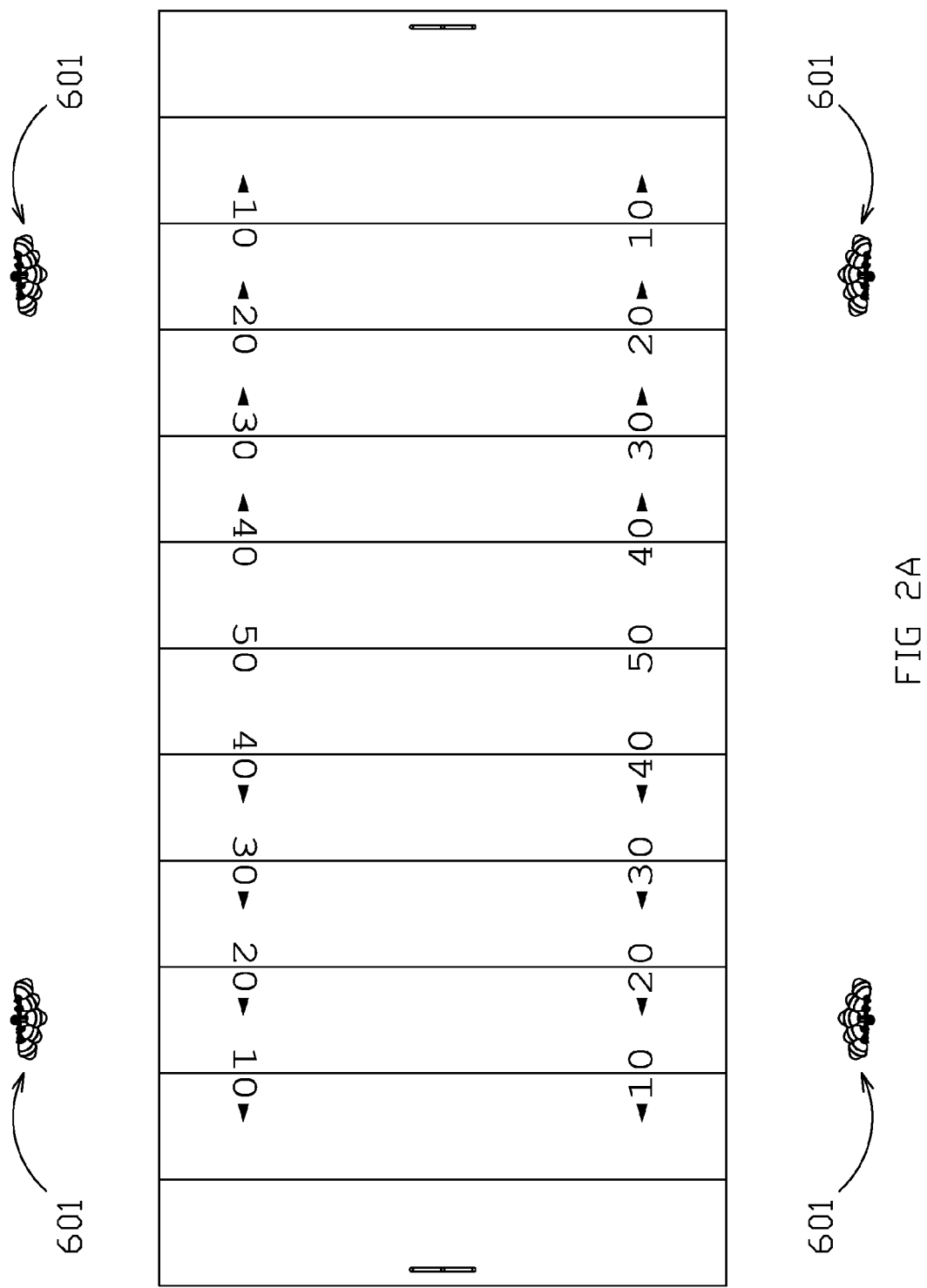
Figure 2B:
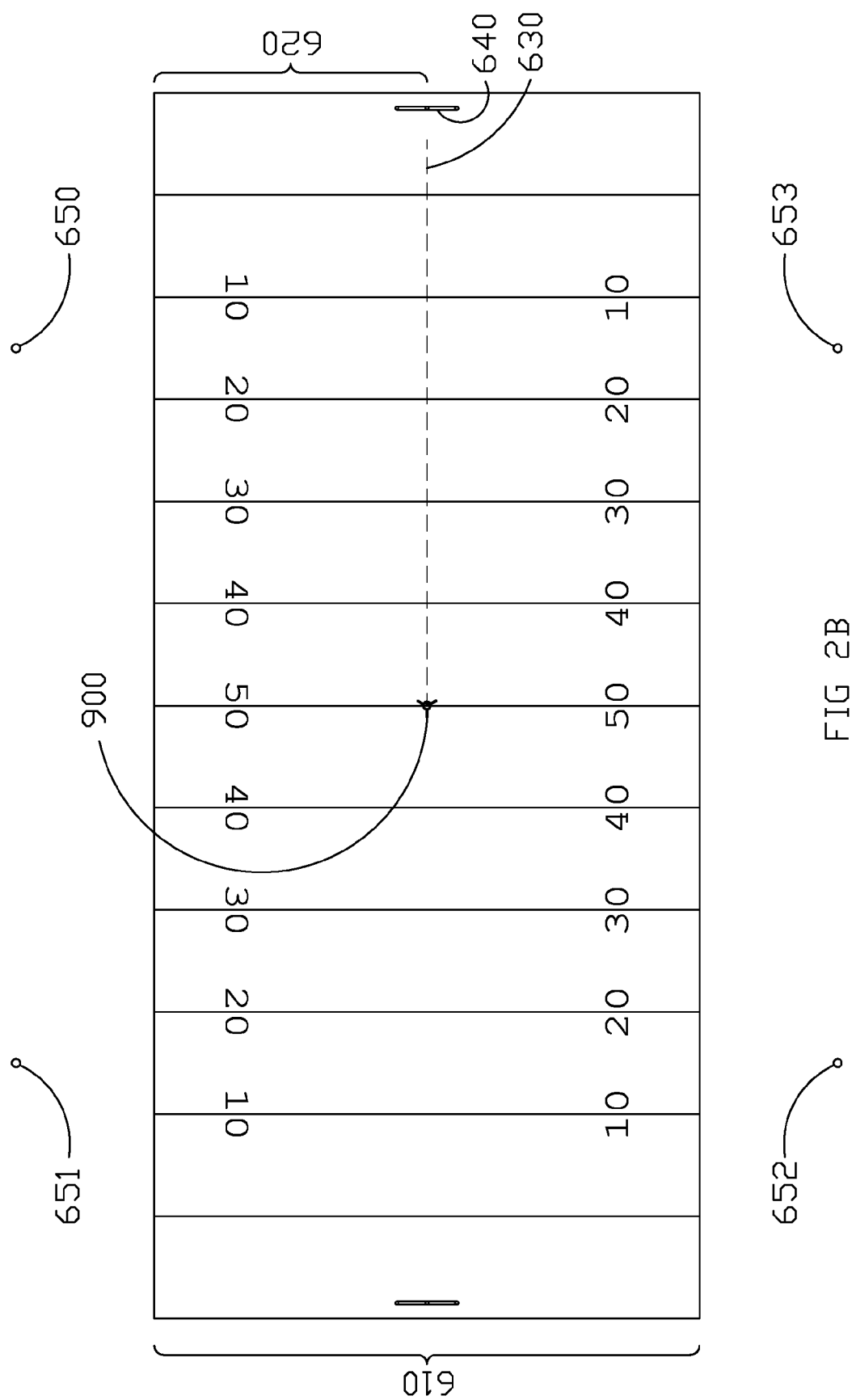
Figure 2C:
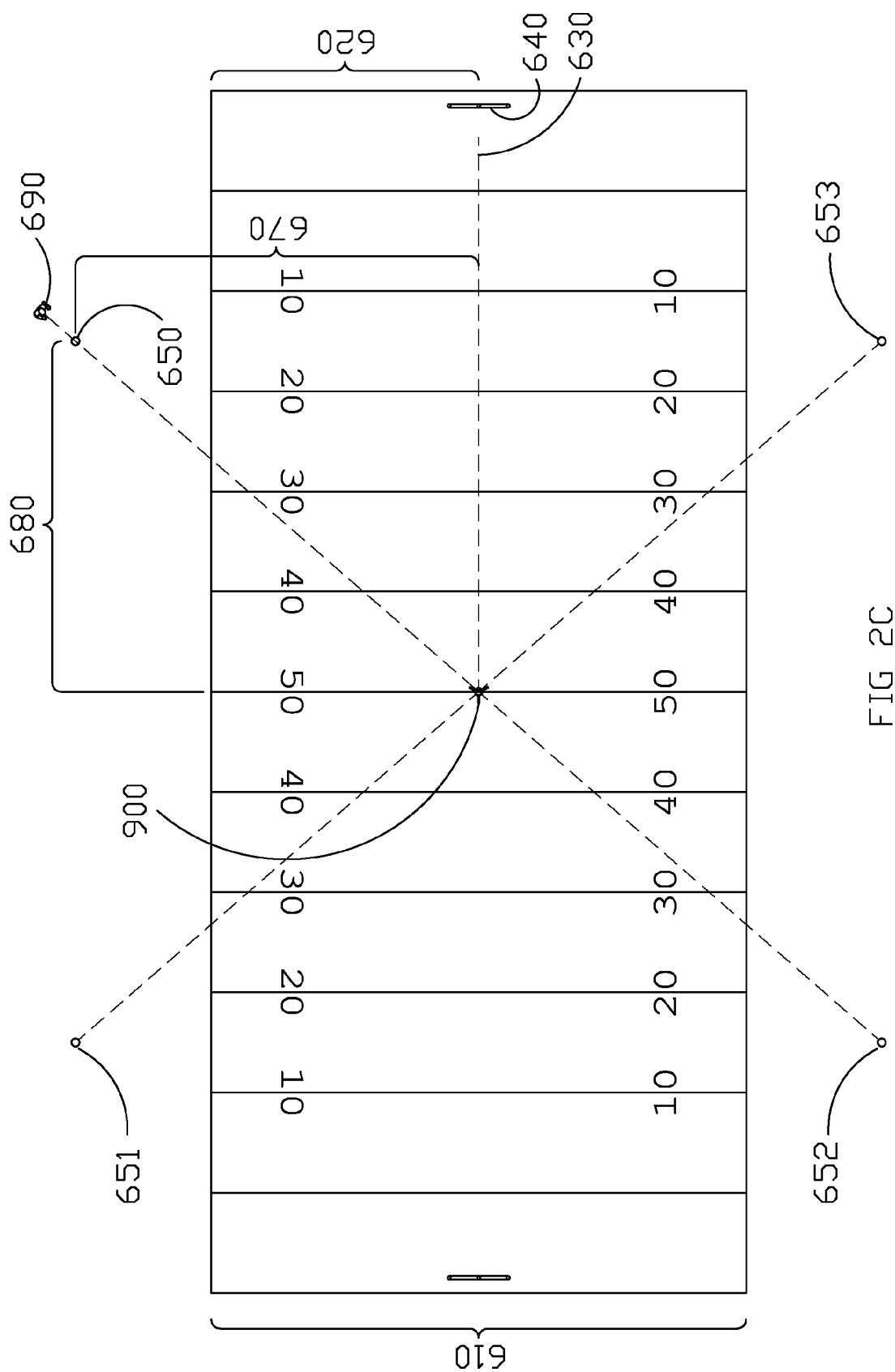

As a further example, FIG. 2A illustrates a plan view of an actual typical football field with poles 601 spaced about the periphery, each pole 601 correlating to an actual point location (see reference nos. 650-653) in FIG. 2B. Generally, an actual origin point 900 may be located on the 50 yard line and an actual zero line 630 run through the center of goal post 640, which may be verified by halving known distance 610 to determine distance 620. As may be seen from FIG. 2C, a user 690 may determine actual point location 650 by measuring distance 680 along actual zero line 630 and measuring distance 670.

As may be appreciated from the aforementioned figures, whether using a polar coordinate system (as in FIGS. 1A-C) or a Cartesian coordinate system (as in FIGS. 2A-C), the accuracy of determining a plurality of actual point locations on an area of interest is improved by knowing an actual origin point (such that all actual point locations are measured from the same position with respect to each other) and knowing an actual zero line (such that actual point locations are measured from the same position with respect to the area of interest).

As indicated earlier, both examples of FIGS. 1A-C and FIGS. 2A-C may be described as assigning an actual reference location on the area of interest (the analog to the actual origin point described immediately above), assigning an actual radial reference direction (the analog to the actual zero line described above), and defining an actual location in the area of interest by a measurement or measurements taken between (a) the actual location and (b) the assigned actual reference location and actual radial reference direction. The assigned actual reference location and actual radial reference direction may be assigned by some predetermined or predesigned layout or plan, or by actual landmarks on the area of interest. If a plurality of actual locations throughout the area of interest are defined using the same assigned actual reference location and actual radial reference direction, all definitions are tied to and based on these common references.

B. Exemplary Method and Apparatus Embodiment 1

Figure 3A:
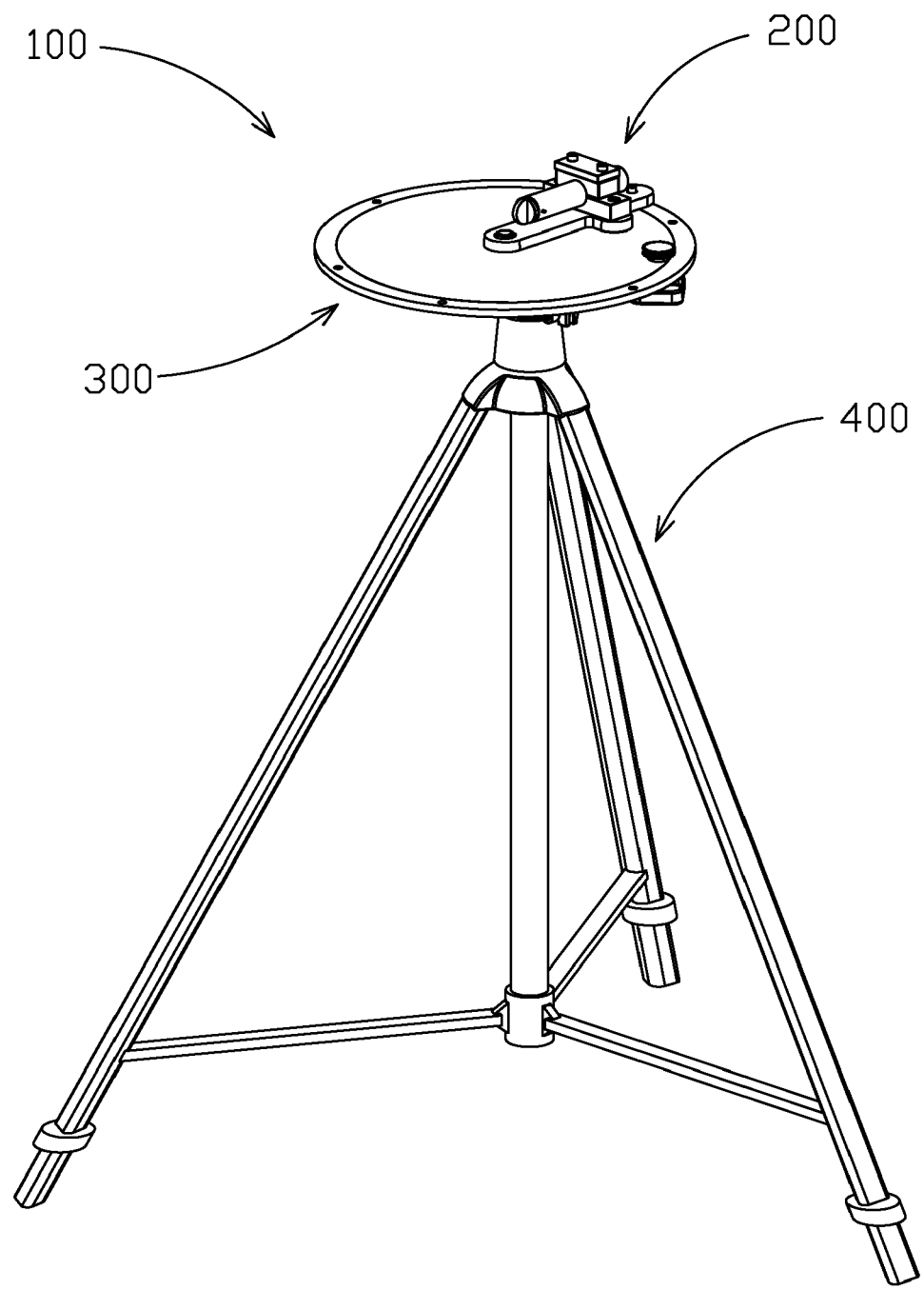
Figure 3B:
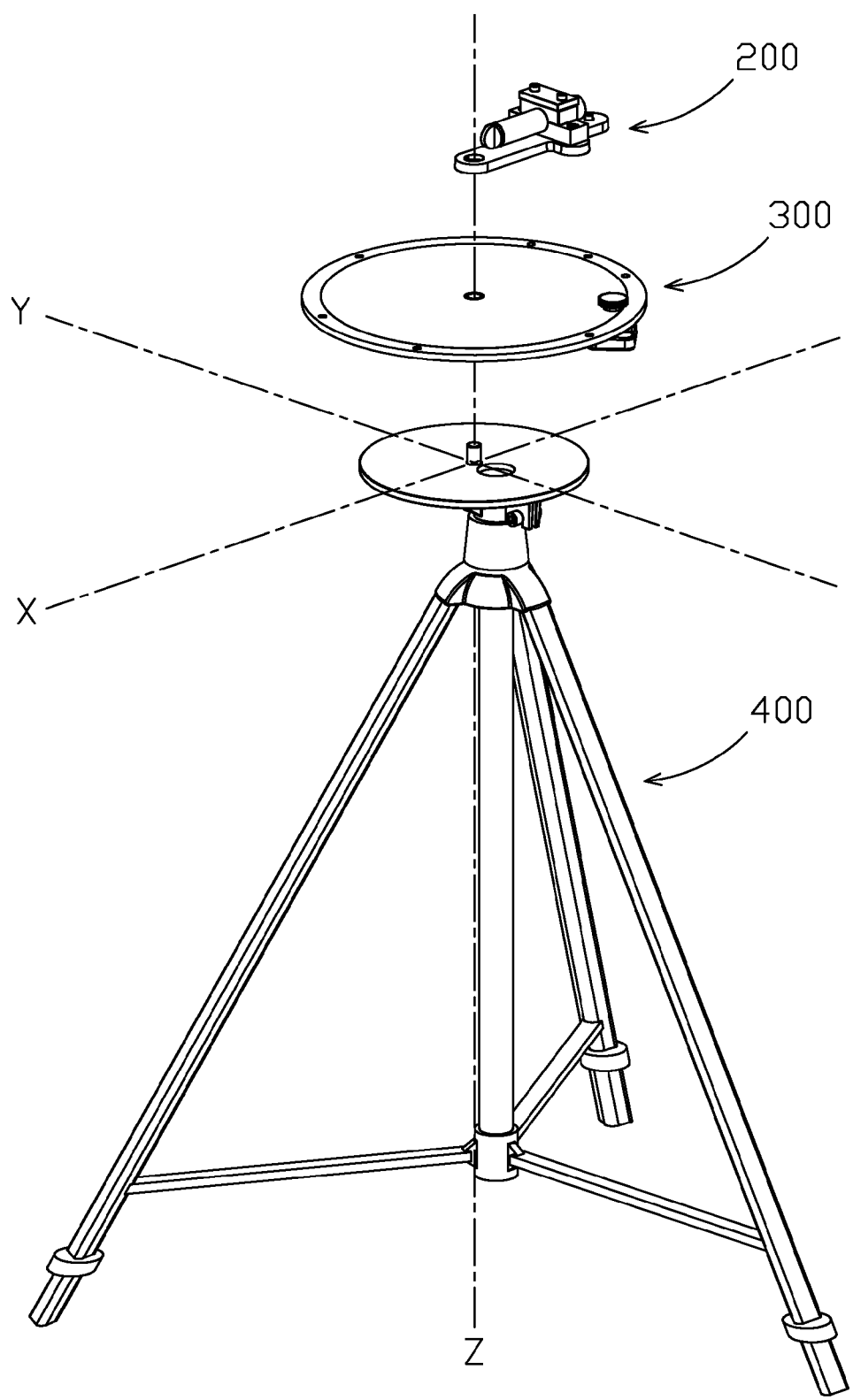

A more specific exemplary embodiment, utilizing aspects of the aforementioned generalized examples, will now be described. Illustrated in FIGS. 3A and 3B is one example of a locator apparatus 100 which comprises a base assembly 400, plate assembly 300, and laser aiming assembly 200. Operation of locator apparatus 100 may generally be characterized by the following process.

Figure 4A:
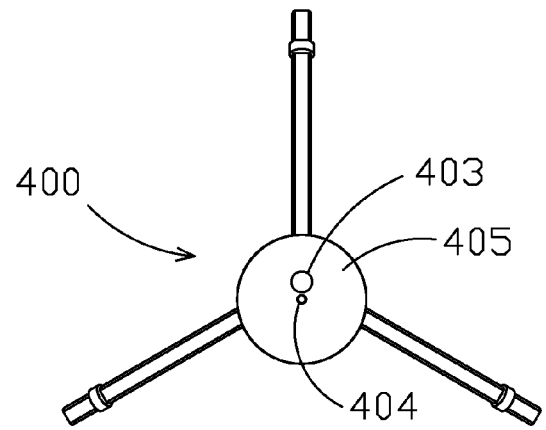
Figure 4B:
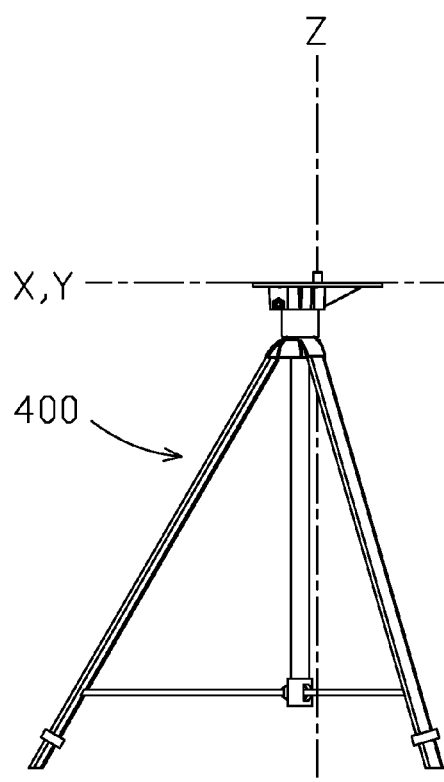
Figure 4C:
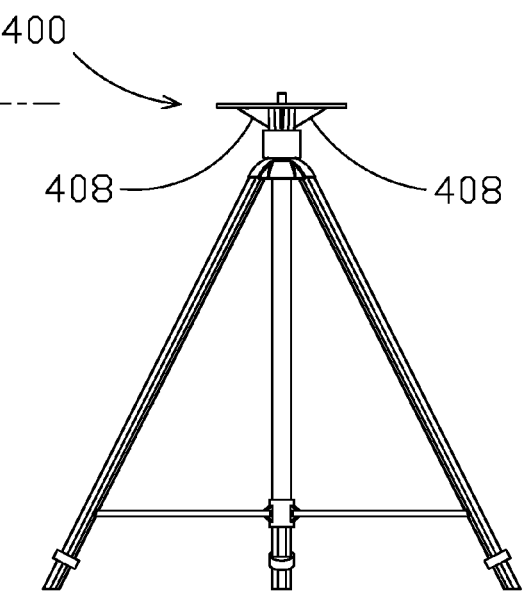
Figure 4D:
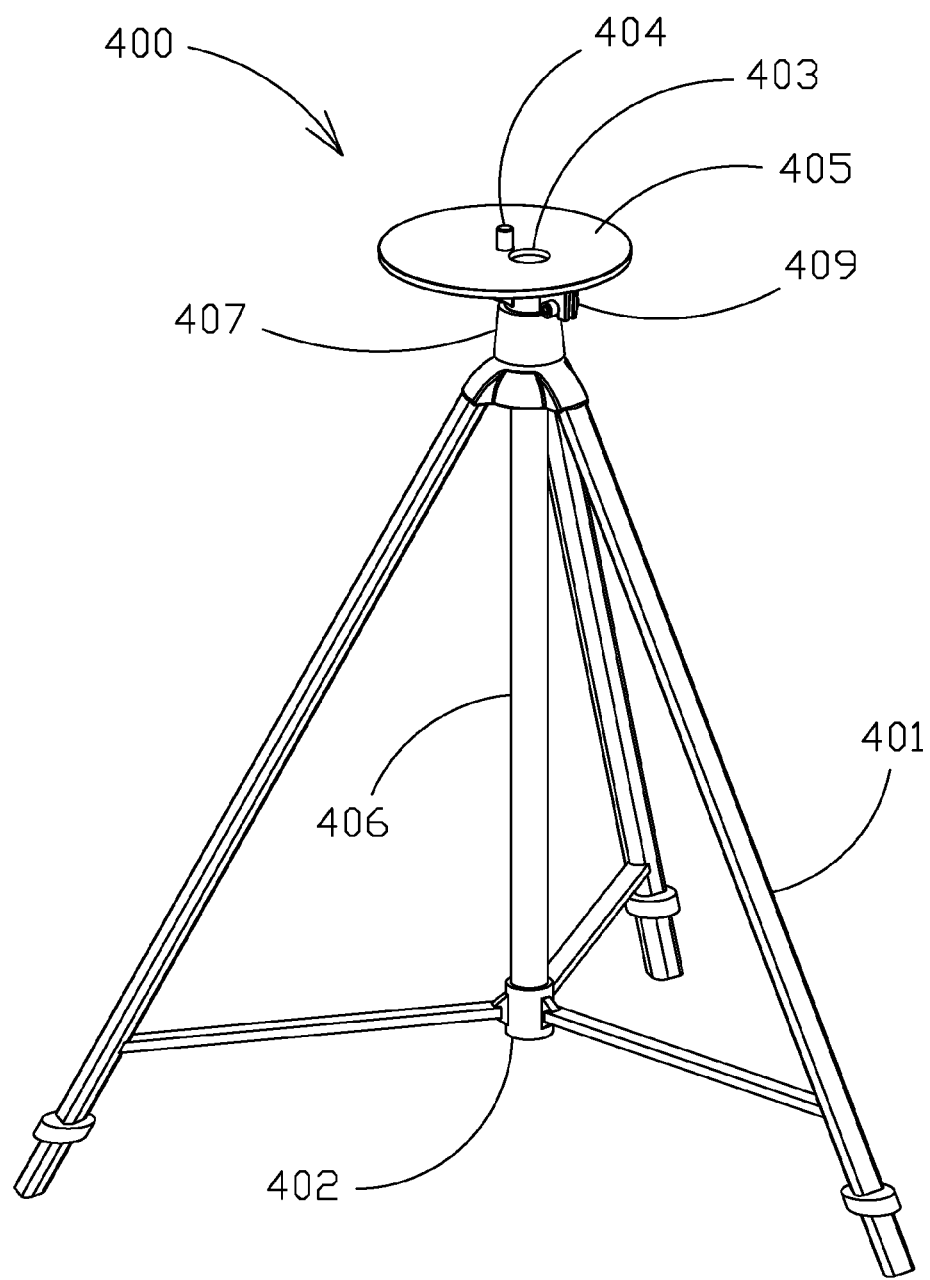

1. Base assembly 400 (see also FIGS. 4A-D) is placed at an actual origin point on an area of interest and leveled.
    a. A map, layout, or scale-model plan of the area of interest, including a layout origin point 303, is indicated (in this example) on plate assembly 300 (see, e.g., reference number 800 in FIG. 5E). In this example, map, layout, or plan 800 includes a graphic, scale-model of an athletic field layout, here two side-by-side soccer fields. Points of interest on the map, or plan points, are six pole locations S1-S6 marked on the map. The map includes layout zero line 806 extending radially from layout origin point 303, as well as radial lines from layout origin point 303 through each pole location S1-S6. Note how each radial line, including layout zero line 806 extend to the periphery of map 800 and that a pre-formed aperture 302 in plate 301 is aligned with each radial line. Actual, not scale, radial distances between layout origin point 303 and each pole location S1-S6, as well as actual Cartesian distances, are displayed on map 800 relative layout origin 303. Other indicia is on map 800. Examples are a compass rose 803 with actual directional orientation of the fields indicated and a scale legend 801, providing the scale ratio for map 800 relative to the actual area of interest. Base 400 is placed over the actual origin point on the ground such that post 404 on base 400 is vertically above the actual origin point as aligned along the vertical axis (labeled "Z"). Plate 405, by adjustment means, may be leveled as close as possible to the horizontal plane diagrammatically indicated in FIGS. 3B and 4B by the horizontal axes (labeled "X" and "Y").
2. Laser aiming assembly 200 (see, e.g., FIGS. 6A-D) is placed in a first position on plate assembly 300 (see, e.g., FIGS. 5A-D).
3. Laser aiming/plate assembly 200/300 is placed on base assembly 400 and rotated (e.g. around base post 404) until the layout zero line 806 indicated on a label (see reference no. 800) of plate assembly 300 is roughly aligned with landmarks on the area coordinated with the correct and intended direction of the layout zero line or rotated until the compass rose 803 is in the correct rotational orientation relative the earth, or some other indicia on label 800 is roughly rotationally oriented relative some landmark or reference. For example, if from layout 800 it is known that the actual origin location on the ground is along a straight line between the centers of the actual side-by-side soccer fields in the area, laser/plate assembly 200/300 may be rotated until layout zero line 806 on layout 800 is roughly aligned with the actual centers of both fields. Aperture 303 of plate 300 may be placed over post 404 of base 400 to provide a rotation axis and aperture 201 of laser assembly 200 also fit over base post 404 so that it rotates with plate 300.
4. With laser assembly 200 mounted along layout zero line 806 such that its laser is calibrated to project radially from apparatus 100 outwardly from layout origin point 303 along layout zero line 806, and the laser of laser aiming assembly 200 operating, a user may perform fine back and forth partial rotations of laser aiming/plate assembly 200/300 until a second user at a receiving point along the zero line verifies laser aiming assembly 200 is aligned along the zero line. Since the laser beam is aligned within an acceptable range of tolerance with layout zero line 806, it essentially extends the layout zero line 806 out from apparatus 100 and creates an actual zero reference line relative the area. Without tape measures, the user may use various techniques to locate the laser beam, even if tens or hundreds of feet away from apparatus 100 (see, e.g., distances in FIG. 5E) and thus quickly, easily, and accurately within acceptable tolerance assign an actual zero reference line on the area.
    a. Alignment and calibration of laser aiming assembly 200 may be verified using a variety of methods; some possible methods are discussed in U.S. Pat. No. 7,500,764, incorporated by reference herein. Generally, laser 10 is modified (typically by a lens or other optic) and laser 10 rotated about its longitudinal axis and clamped or fixed in position in its components 22 and 23 (see FIGS. 6A-D) such that the projected beam from laser 10 is spread in a vertical plane (vertical generally being defined as perpendicular to the ground on which locator apparatus 100 sits). When a user rotates laser aiming/plate assembly 200/300 around base post 404 (i.e. around a generally vertical axis) to bring the laser beam, spread in a vertical plane, into rough correspondence with the actual zero line on the area, the plane of laser light sweeps horizontally across the area radially from the actual origin point. A second user standing roughly along the intended position of the actual zero line and looking towards apparatus 100, will perceive a brief exposure to illumination (also referred to as a flash) when said laser light plane is aligned with the user and, thus, roughly establish the actual zero line, even at tens or hundreds of feet away. If needed, fine back and forth rotations of laser/plate assembly 200/300 may be made by the first user, on opposite sides of and across the correct direction of layout zero line 806, and the second user adjust position, if needed, to verify the correct location of the actual zero line.
    b. It is of note that a reflective surface or a sensor may be placed out in the area along the intended actual zero line direction and pointed at apparatus 100 and used by a single user rotating laser/plate 200/300 at apparatus 100 to perceive the flash when the beam sweeps to the distant location of the reflective surface or sensor and, thus, may be used in lieu of a second user standing away from apparatus 100 in the area. The single user sees the flash to indicate alignment with the beam or the sensor may signal the single user if it senses the beam.
    c. This is the only step which requires a second person or receiving device (e.g. reflective surface, sensor, etc.).
5. Plate assembly 300 is secured in the aligned position to base assembly 400. By the positioning of laser assembly 200 in alignment with layout zero line 806 on plate 300, and then establishing the actual zero line radially projected out tens or even hundreds of feet from apparatus 100, both (a) a common actual origin location (the place on the ground where base 400 is set up so that plate aperture 303 (and thus layout origin point 303) is essentially directly vertically above the actual origin location) and (b) a common radial reference line from the actual origin location the actual zero line) are established for locating one or more points of interest (e.g. in this example pole locations) correlated to their positions on the layout 800 on plate 300.

6. Laser aiming assembly 200, with the laser operating, is placed in a second position on plate assembly 300. For example, post 202 is lifted out of the aperture 302 on plate 300 aligned with layout zero line 806 and laser assembly 200 is rotated around base post 404 until radially aligned with a line on the layout extending from layout origin point 303 to layout pole position S1, S2, S3, S4, S5, or S6. Laser 10 would project a beam further radially outward from apparatus 100 on the area. For example, for layout pole position S1, laser assembly 200 would be rotated around post 404 approximately 150 degrees counterclockwise from the layout zero line position.

7. A user then measures the distance indicated on label 800 of plate assembly 300 to the first point location, verities alignment with the laser beam (e.g. as previously described), and marks the location. In the example of layout pole position S1, the user would measure the 266 feet, 1 inch marked on layout 800 along the laser beam. The location of actual position S1 is thus quickly, efficiently, and within an acceptable range of accuracy identified with just (a) establishing the actual origin location on the area (b) establishing an actual radial reference line with the laser, and (c) using the indicia on the layout which is on or associated with apparatus 100 by moving the laser beam to an offset position related to the common actual origin location and common actual zero line to establish a projected reference line out into the area along which the actual location to be located in the area should reside, and then using the indicia on layout 800 to measure an actual distance along that new laser plane position to locate the actual position on the area. The offset from the actual origin location and actual zero line may be described by angular displacement and distance. Other geometrical descriptions may be used. But once the origin and zero line references are established, the user(s) may simply use the indicia on the layout 800 to align the laser to each layout pole point and measure along the laser each corresponding distance indicated on the layout.

8. Steps 6 and 7 are repeated as necessary until all point locations (as indicated on label 800 of plate assembly 300) are determined and marked. In this example, pole layout points S2-S6 may each be located in the area by the same method. Thus, six pole positions, each one hundred or more feet away from apparatus 100, may quickly and easily be located with an acceptable degree of accuracy.

Base assembly 400, as illustrated in isolation in FIGS. 4A-D, comprises support members 401 which are each individually adjustable in length, and positionally adjustable as a group via connective member 402 along support bar 406. Base assembly 400 further comprises a fastening device 409 (in this example, a pipe clamp-type device) which is positioned about post 407 such that a plate 405 affixed to fastening device 409 may be positioned. Plate 405 may be positioned such that post 404 and level 403 (which, in this example, are integral to post 407) may project through apertures in plate 405 as plate 405 rests on projecting arms 408; fastening device 409 may then be tightened to positionally hold plate 405 relative to post 407. It is of note that, as envisioned, base assembly 400 is shipped with all components already positioned and affixed, though this is by way of example and not by way of limitation. It is of further note that the components of base assembly 400 may differ from those described herein and not depart from the intended functionality of base assembly 400. For example, plate 405, arms 408, post 404, level 403, and post 407 may be formed as a single part and, thus, may omit fastening device 409 from the design.

As may be appreciated, base assembly 400 may be completely, or in substantial part, any of a number of relatively low-cost tripods that have a mounting interface or working head to which may be mounted a device. The mounting or interface may be leveled (and/or include a level) and may have multiple degrees of freedom of adjustment (e.g. 3-way pan capabilities). One example is a commercially-available, inexpensive, lightweight, hand-carryable and portable camera tripod such as a Model Deluxe 200 Tripod from Canon, Inc., Lake Success, N.Y., U.S.). Other types of bases 400 are possible.

With respect to FIGS. 5A-E, plate assembly 300 comprises a plate 301 (e.g. stamped or machined, inexpensive metal) with a center aperture 303 through which post 404 (see FIG. 4D) passes. Plate assembly 300 further comprises plural apertures 302 which are used in conjunction with label 800 (generally affixed to plate 301 prior to shipping, though this is by way of example and not by way of limitation) to help indicate point locations (by being formed in plate 300 at peripheral radial positions from layout origin point 303 along lines through the layout points of interest (e.g. layout pole positions S1-S6, as well as layout zero line 806)). This allows laser assembly 200 to quickly and accurately be moved into position and relatively securely held in place (by aperture 201 around common layout origin point 303/base post 404 and laser assembly post 202 in a selected plate aperture 302—with the bottom of laser assembly arm 21 supported along the top of plate 300). Plate assembly 300 further comprises clamp assembly 500 which enables plate 301 to be affixed to plate 405 of base assembly 400 (see FIG. 4D) by tightening fastening device 501 (in this example, a screw and nut combination) through aperture 304 such that housing 503 compresses plate 405 against plate 301 at void 502. Thus, once fastened, plate 300 would not rotate or move relative to plate 400. As may be appreciated by those skilled in the art, plate 300 may be mass produced relatively inexpensively. It may then be relatively inexpensively customized (e.g. apertures 302 formed) to suit each plan 800, which may differ from one another. Plate 300 is thus producible for in the range of a few dollars or less, as may be plate 405, if needed. Likewise, label 800 may be custom prepared for each layout or plan, but may be printed inexpensively on paper or other thin, inexpensive sheet material. Application may be by inexpensive adhesive or other inexpensive means as it likely will be used once for the point locating. Alternatively, a computer controlled machining device may etch indicia into plate 300 or a printing device may print or apply ink or paint indicia of the layout or plan to plate 300.

While plate 301 and label 800 are tailored to suit a particular application, in this example label 800 may generally be characterized by one or more of the following:
  a. data label 805 indicating in text or machine-readable form pertinent information (e.g. contact person, geographic location of the site, company logo, phone number, etc.);
  b. scale bar 801 indicating scale of indicia on label 800;

c. compass rose 803 indicating orientation of cardinal directions with respect to indicia on label 800;

d. layout zero line 806 indicating initial laser aiming assembly 200 position;

e. Cartesian coordinates 804 of each point location with respect to the origin point; and f. identification/polar coordinates 802 of each actual point location on the area with respect to the actual origin location on the area.

As envisioned, the layout origin point coincides with aperture 303. Post 404 (see FIG. 4D) passes first through aperture 303 in plate 300 and then at least partially passes through aperture 201 of laser aiming assembly 200 (see FIGS. 6A-D) such that one end of laser aiming assembly 200 is effectively anchored at the layout origin point 303 (see FIG. 3A) and sits on label 800 affixed to plate 301.

With respect to FIGS. 6A-D, laser aiming assembly 200 comprises a laser assembly 10 and structural assembly 20. Laser assembly 10 may be of virtually any commercially available, relatively low power type that comprises at least (i) a light source (in this example, an industrial grade red LED with a 60 degree fan spread, though this is by way of example and not by way of limitation—e.g. model PLKD LDBXQ03B available from Yueqing Dengke Electron Ltd., Sifan Town, Yueqing, Zhejiang, China), (ii) a housing 12 (in this example, a tubular housing) which may be adjustably (rotationally and longitudinally) secured in structural assembly 20, and (iii) on/off functionality (in this example, a knob 11). For example, such devices may be on the order of just a few dollars or less each, be a few inches long by a fraction of an inch in diameter, and have output power at the milliwatt (mW) level. In particular, they may be visible lasers have output power of Class II (less than 1 mW) or Class IIIa (1-5 mW) or less, under the American National Standards Institute and Food and Drug Administration.

Laser assembly 10 is positionally held or clamped between upper component 23 and lower component 22 of structural assembly 20 when fastening device 24 is tightened. Laser/component assembly 10/23/22 is further secured to a support arm 21 by fastening device 26. Support arm 21 further comprises post 202, which is removably secured in one of apertures 302, and aperture 201 which, as has been stated, is positioned about post 404. Laser aiming assembly 200 is designed to have one end pivot about the origin point/post 404 and the other end removably anchor in any of apertures 302 to facilitate determining point locations. As envisioned, laser aiming assembly 200 is rotatably aligned around its longitudinal axis in clamping pieces 22 and 23 prior to shipping to produce a projected beam from laser assembly 10 that is aligned in a vertical plane with respect to support arm 21 (which is defined as being horizontal) when placed on horizontally leveled plate 300 on base 400, though this is by way of example and not by way of limitation.

One benefit of the present embodiment is such that the labeling clearly indicates the layout origin point and layout zero line, and thus assists positioning apparatus 100 at the actual origin point and orienting apparatus 200 in the direction of the actual zero line, which may not be readily discernable if the area of interest is asymmetrical or if features are missing (e.g. foul lines, bases, etc). Further, since label 800 is affixed to plate 301, there is little concern that label 800 will be misplaced. Additionally, label 800 allows a user to see a layout or scale-model plan of the overall area of interest, which allows a better understanding of point locations.

Thus, as may be seen from the exemplary embodiment, the method and system provides relatively quick, easy, economical location of actual positions around an area of interest with accuracy within a range of tolerance that may be acceptable for many applications.

The cost of apparatus 100 may be under 100 dollars. For some applications that involve tens or even hundreds of thousands of dollars, apparatus 100 may be justified to even sometimes be disposable or a one-time use device. And labor costs for use are controlled as no more than two workers are needed, and plural points may be located relatively quickly, minimizing the labor time for each application.

Accuracy within an acceptable tolerance range with apparatus 100 and the above-described method involves the following. In many applications, if not most, absolute accuracy is not required. Therefore, the user should use ordinary care to level base 400 with, for example, an on-board bubble level or other relatively inexpensive level. The user should use ordinary care to vertically align layout origin point 303 with the actual origin location on the area. This may be with a bubble level, a plumb bob, or even perhaps by sight. Other methods are, of course, possible. The verification of the actual zero line should be as close as possible by at least a first rough verification (e.g. by an initial flash confirmation along the correct direction). As mentioned, finer verification by spending a little more time (e.g. the fine back and forth fine rotations) may be used. A measurement device such as a tape measure may be used to measure actual distances. Each of these steps does not require absolute accuracy, and thus there will likely be some range of tolerance from absolute accuracy. For example, there should be less than a few feet range of tolerance at the distances being located relative to the pole locations of FIG. 5E (from around 100 to 300 feet away from apparatus 100). This range of tolerance is possible by following ordinary care in positioning apparatus 100 relative to the actual origin location on the area, and establishing the actual zero reference line, such as with the laser beam described above. Such tolerance may be acceptable, for example, for locating pole positions for a sports lighting installation. This tolerance may be acceptable, and tends to be more accurate than the practice of pole location by tape measure alone, for computer designed lighting plans for such fields to comply with standards or specifications for such fields. However, it is to be understood that better accuracy than that may be achieved (e.g. via fine-tuning and verifying). The method and system enables quite accurate point location for a variety of applications and uses, the degree of accuracy being, at least in part, under the control of a user.

The method uses a priori knowledge, layouts, designs, or instructions, which assigns (a) location of an actual origin location (or actual reference location) in the area and (h) direction of an actual zero line from the actual origin location (or actual reference direction from the actual reference location) in the area. The user(s) just have to physically locate and position the apparatus 100, 101, 102, or 103 (or the like) at the assigned actual origin location (or actual reference location) within acceptable tolerance for the application, and physically locate and orient the apparatus relative to the assigned actual zero line (or actual reference direction). The a priori knowledge may take the form of a layout or scale-model plan that may be physically associated with or on the apparatus, or separate from it.

C. Exemplary Method and Apparatus Embodiment 2

Figure 7A:
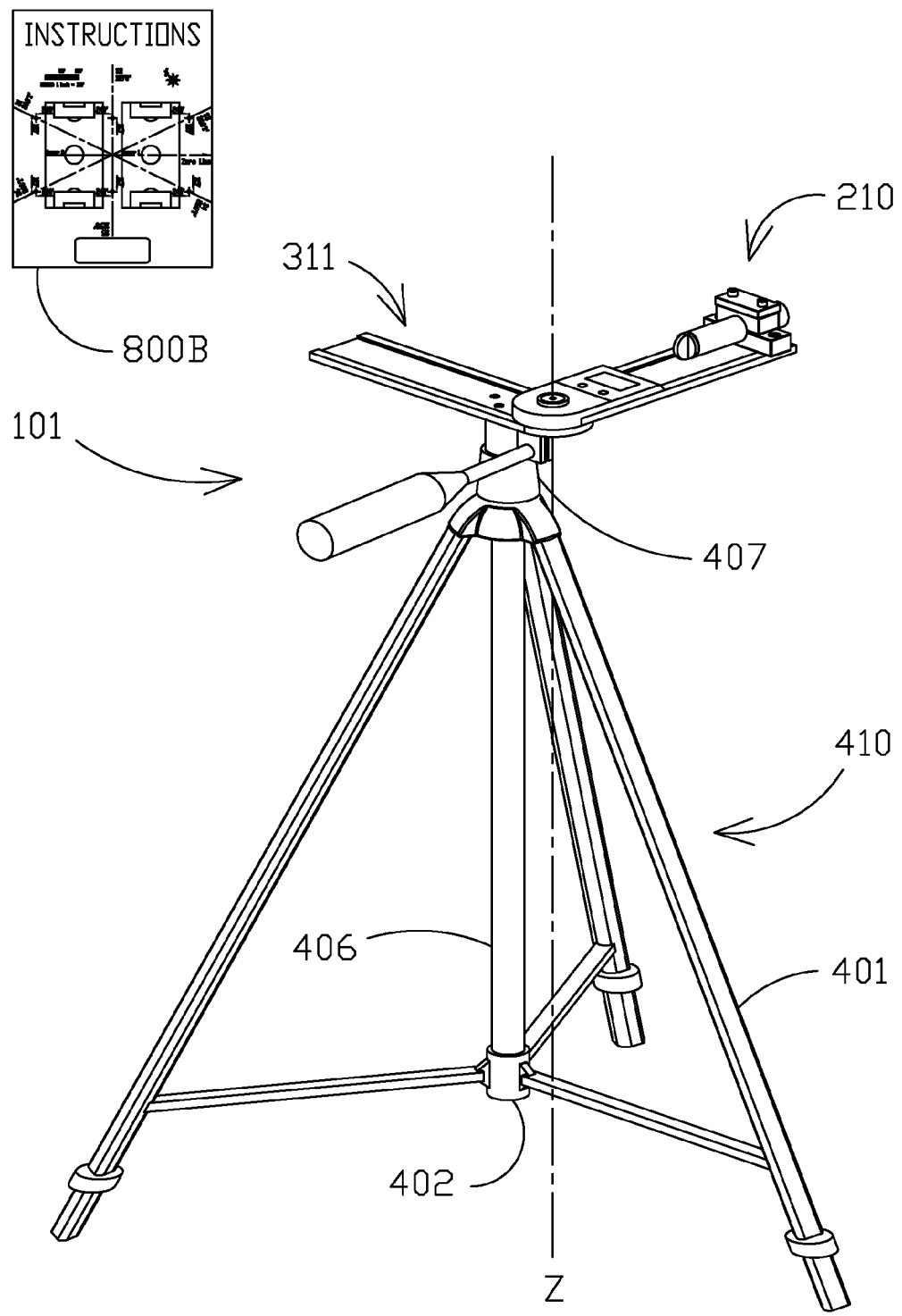
Figure 7B:
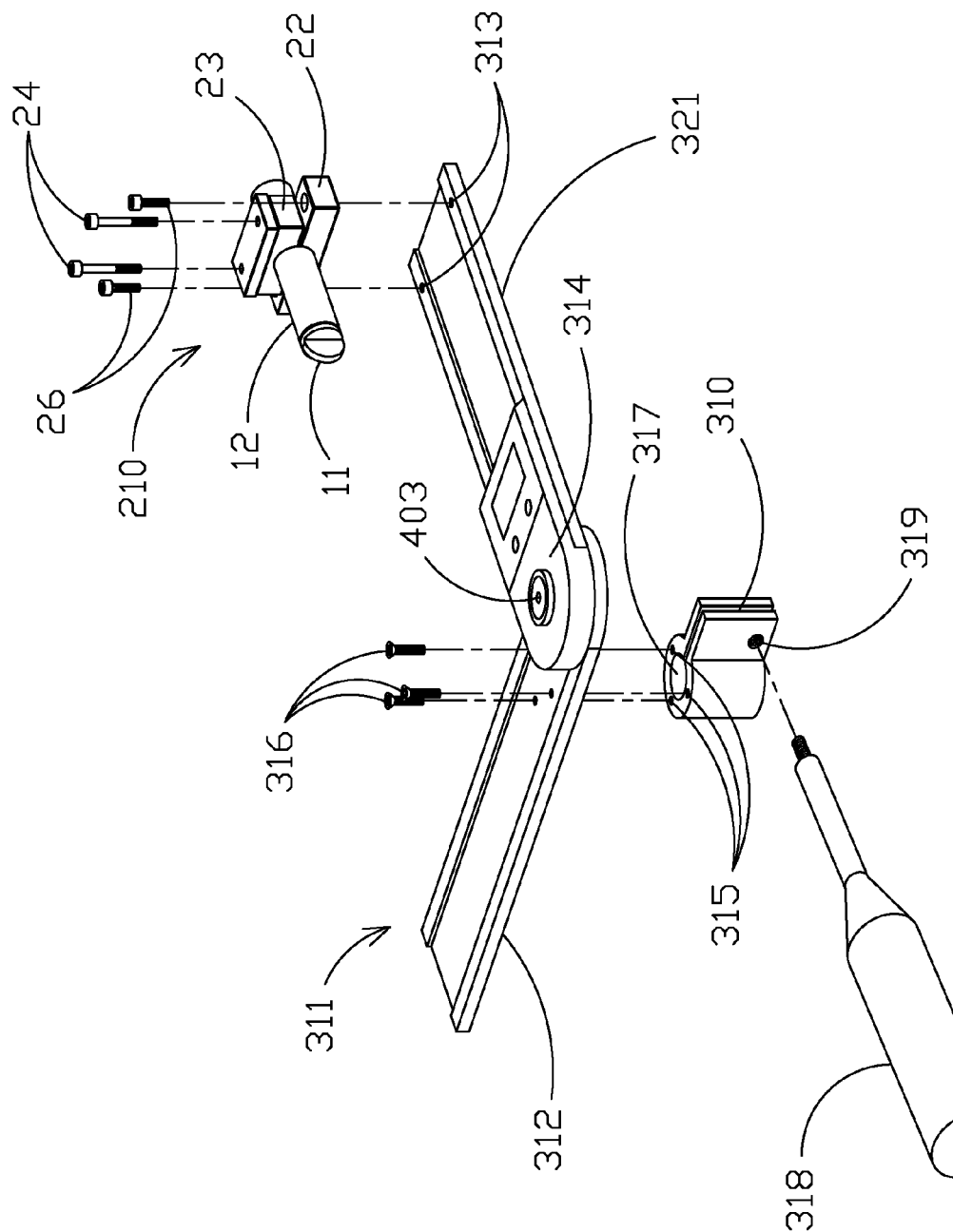

An alternative exemplary embodiment in which angular displacement from a layout zero line is determined by a protractor-type device (instead of apertures in a plate) will now be described. Illustrated in FIGS. 7A and 7B is a locator apparatus 101 which comprises a base assembly 410, protractor assembly 311, and laser aiming assembly 210. Operation of locator apparatus 101 may generally be characterized by the following process. Base 101 may be a tripod, as previously described, or an analogous support. Protractor 311 may be a commercially available digital protractor with digital readout that provides angular displacement of one from the other.

1. Base assembly 410 is placed at an actual origin point at an area of interest indicated on a set of instructions (see, e.g., independent, handheld sheet instructions 800B in FIG. 7A).
    a. As envisioned, instructions 800B are a document form of label 800.
2. Protractor/laser aiming assembly 311/210 is placed on base assembly 410 and secured by any of a variety of methods within the skill of those skilled in the art. Laser assembly 210 is attached to arm 321 of protractor 311 so that its beam would project along the longitudinal axis of that arm.
    a. The two arms of protractor/laser aiming assembly 311/210 are closed (pivoted into alignment—not shown) at this step.
3. The whole locator apparatus 101 is rotated around the actual origin location (i.e. rotated around vertical axis "Z" extending in FIG. 7A) until laser aiming assembly 210 is aligned along the actual zero line indicated on the instructions. For example, the actual zero line may be landmarks in or around the area of interest (e.g. baselines, a line through home plate and second base, a set of hash marks or a yard line on a football field, etc.)
4. Locator apparatus 101 is leveled.
5. With the laser of laser aiming assembly 210 operating, a user may perform fine rotations of locator apparatus 101 until a second user at a receiving point along the actual zero line verifies laser aiming assembly 210 is aligned along the actual zero line.
    a. Verification of laser aiming assembly 210 alignment is completed in the same fashion as described for laser aiming assembly 200 in Exemplary Method and Apparatus Embodiment 1.
    b. As in Exemplary Method and Apparatus Embodiment 1, a reflective surface or sensor may be used in lieu of a second user.
    c. This is the only step which requires a second person or receiving device (e.g. reflective surface, sensor, etc.).
6. Arm 321, with the laser operating, is rotated to a first position relative to arm 312 of protractor 322, as indicated on the instructions 800B. For example, instructions 800B have indicia indicating a first angular displacement from the zero line for a point of interest. The user merely rotates the protractor arm bearing laser 210 until the digital readout indicates the instructed angular displacement has been reached. The laser then projects radially outward in the area to create a direction to the first point of interest to locate within an acceptable degree of accuracy or tolerance.
7. A user measures the actual distance indicated on the instructions 800B to the first point location, verifies the laser beam may be seen, and marks the location.
8. Steps 6 and 7 are repeated as necessary until all point locations (as indicated on the instructions) are determined and marked.

Base assembly 410, as illustrated in FIG. 7A, comprises support members 401 which are each individually adjustable in length, and positionally adjustable as a group via connective member 402 along support bar 406. Base assembly 410 further comprises post 407 which is adapted to at least partially fill aperture 317 of fastening device 310. Fastening device 310 may then be tightened (in this example, by an elongated member 318 which is threaded into aperture 319 of fastening device 310) and used to interface protractor assembly 311 with base assembly 410. It is of note, however, that the components of base assembly 410 may differ from those described herein and not depart from the intended functionality of base assembly 410. For example, protractor assembly 311 may be affixed to post 407 directly and, thus, may omit fastening device 310 from the design.

With respect to FIGS. 7A and 7B, protractor assembly 311 may comprise, as one example, a protractor 314 (e.g. model WR-410 available from Wixey, Seattle, Wash., U.S.) with elongated arms 312 and 321, and level 403 (in this example, a simple bubble level as is well known in the art). Laser aiming assembly 210 (which uses laser assembly 10 as in Exemplary Method and Apparatus Embodiment 1) is affixed to protractor assembly 311 by fastening devices 26 which secure lower component 22 to arm 321 when threaded in apertures 313; fastening devices 24 further secure upper component 23 to lower component 22 in the same manner as described in Exemplary Method and Apparatus Embodiment 1. As envisioned, laser aiming assembly 210 is affixed to protractor assembly 311 prior to shipping, though this is by way of example and not by way of limitation. Protractor/laser aiming assembly 311/210 is affixed to fastening device 310 (in this example, by screws 316 into threaded bores 315) such that when fastening device 310 is tightened, protractor/laser aiming assembly 311/210 is affixed to base assembly 410.

One benefit of the present embodiment is such that unforeseen changes to the landscape of an area of interest may be readily accounted for. For example, assume a football field has an obstruction (e.g. tree, spectator stands, etc.) where a pole is to be placed. In Exemplary Method and Apparatus Embodiment 1, a point location may not be readily shifted as apertures 302 are punched into plate assembly 300 prior to shipping. In the present embodiment, however, one may use locator apparatus 101 to determine a minimum angular displacement to move said point location away from the obstruction. Knowing said angular displacement, other point locations may be adjusted accordingly and thus, desired lighting characteristics maintained with significantly less downtime than if locator apparatus 100 was modified.

As may be appreciated, Embodiment 2 also allows quick, portable, easy, economical location of distributed point(s) around a relatively large area within an acceptable range of tolerance or accuracy.

D. Options and Alternatives

The invention may take many forms and embodiments. The foregoing examples are but a few of those. To give some sense of some options and alternatives, a few examples are given below.

Generally, apparatus for and methods of affixing assemblies and/or components may differ from those described herein without departing from at least some aspects of the present invention. For example, fastening device 24 may comprise dowels which are driven into apertures to produce an interference fit (rather than screws which are threaded into apertures). As another example, fastening device 501 may comprise a c-clamp (rather than a screw and nut combination). As another example, a fastening device (e.g. 409) may be completely omitted from a design if particular components are formed as a single part or otherwise integral (e.g. plate 405, arms 408, post 404, level 403, and post 407).

Generally, the exemplary embodiments use a laser to direct a beam from essentially vertically aligned actual and layout origin points along radially aligned layout and actual zero lines such that a person standing at a receiving point may perceive the beam. As has already been stated, the person perceiving the beam may be replaced with a reflective surface or sensor. As a further option, the laser may be replaced with a sight tube-type device (e.g. Simmons rifle scope model 801002 available from Bushnell Outdoor Products, Overland Park, Kans., U.S.). With this option a user standing at the locator apparatus may look through the sight tube-type device and perform fine adjustments until the second user may be seen. It is of note that with this option a second user would be required for determining each point location as well as alignment along the zero line (whereas in the exemplary embodiments a second person is only required for alignment along the zero line). As another option, the laser may be replaced with a range finder (e.g. model TruPulse 200 available from Laser Technology, Inc., Centennial, Colo., U.S.). As with the sight tube-type device, with this option a user standing at the locator apparatus may look through the range finder and perform fine adjustments until the second user may be seen. With this option a second user is required for determining each point location as well as alignment along the zero line; however, since the range finder is designed to determine distance to an object (in this example, the second user) a tape measure or other device would not be necessary to measure the distance to each point location because the range finder may be used to indicate within acceptable tolerance a distance along the sighted line.

Figure 8:
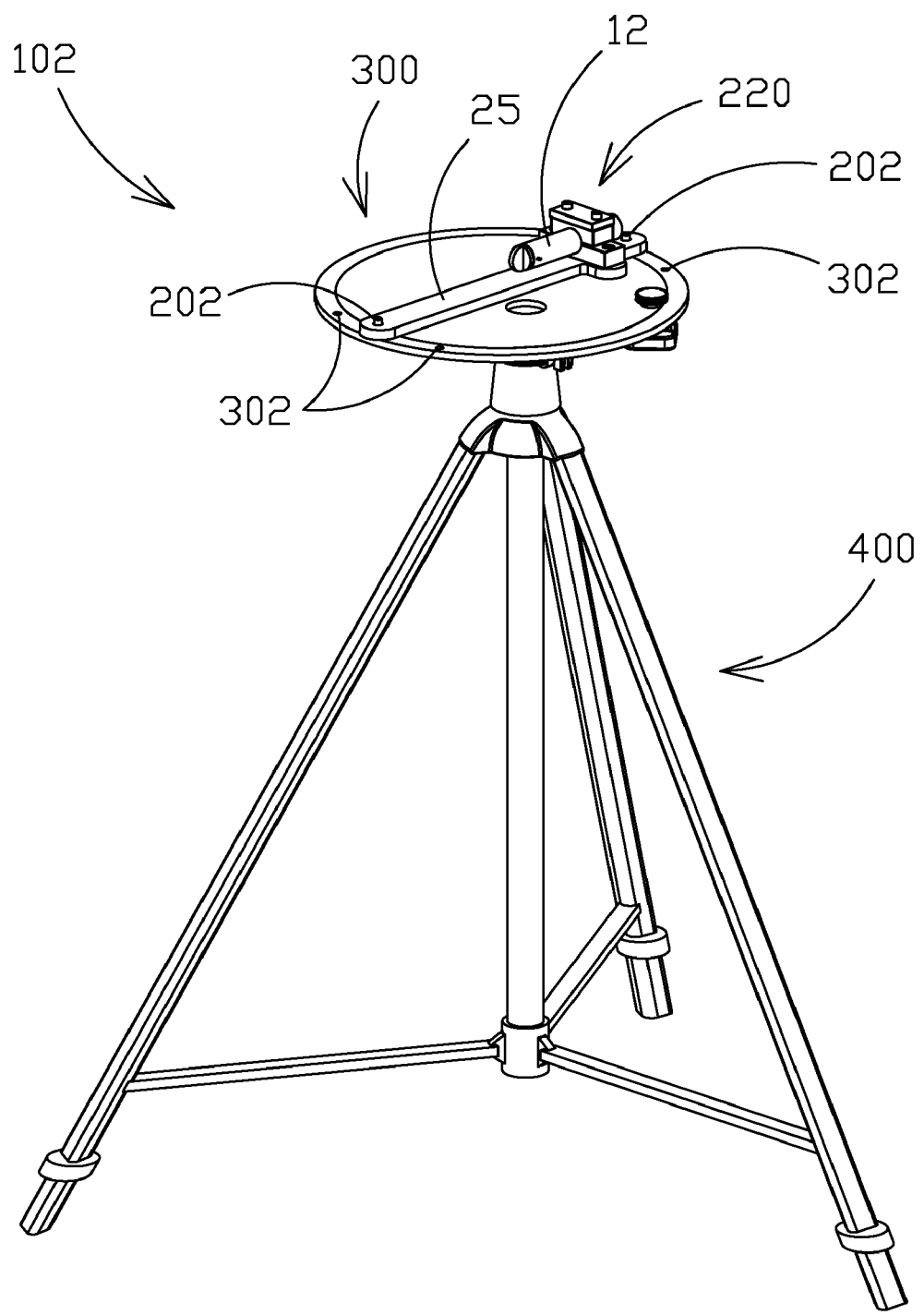
FIG. 8 is a perspective view of an optional modification of the laser aiming assembly of FIGS. 3A and B.

As described in Exemplary Method and Apparatus Embodiment 1, laser aiming assembly 200 comprises structural assembly 20 which further comprises support arm 21, aperture 201, and post 202 to positionally affix and orient laser aiming assembly 200 with respect to plate assembly 300. As may be seen in FIG. 8, one option is to provide an elongated support arm 25 such that laser assembly 220 may comprise two posts 202 (rather than aperture 201 and post 202; see FIGS. 6A-D). This may be beneficial, for example, if it is not feasible to place aperture 303 in plate 301 and/or provide post 404 in base assembly 400.

As described in Exemplary Method and Apparatus Embodiment 1, label 800 is affixed to plate 301 of plate assembly 300, though other methods by which indicia may be imposed on a surface are possible, and envisioned. For example, indicia may be stamped or otherwise printed on plate 301 directly and, thus, omit label 800 from the design.

Figure 9:
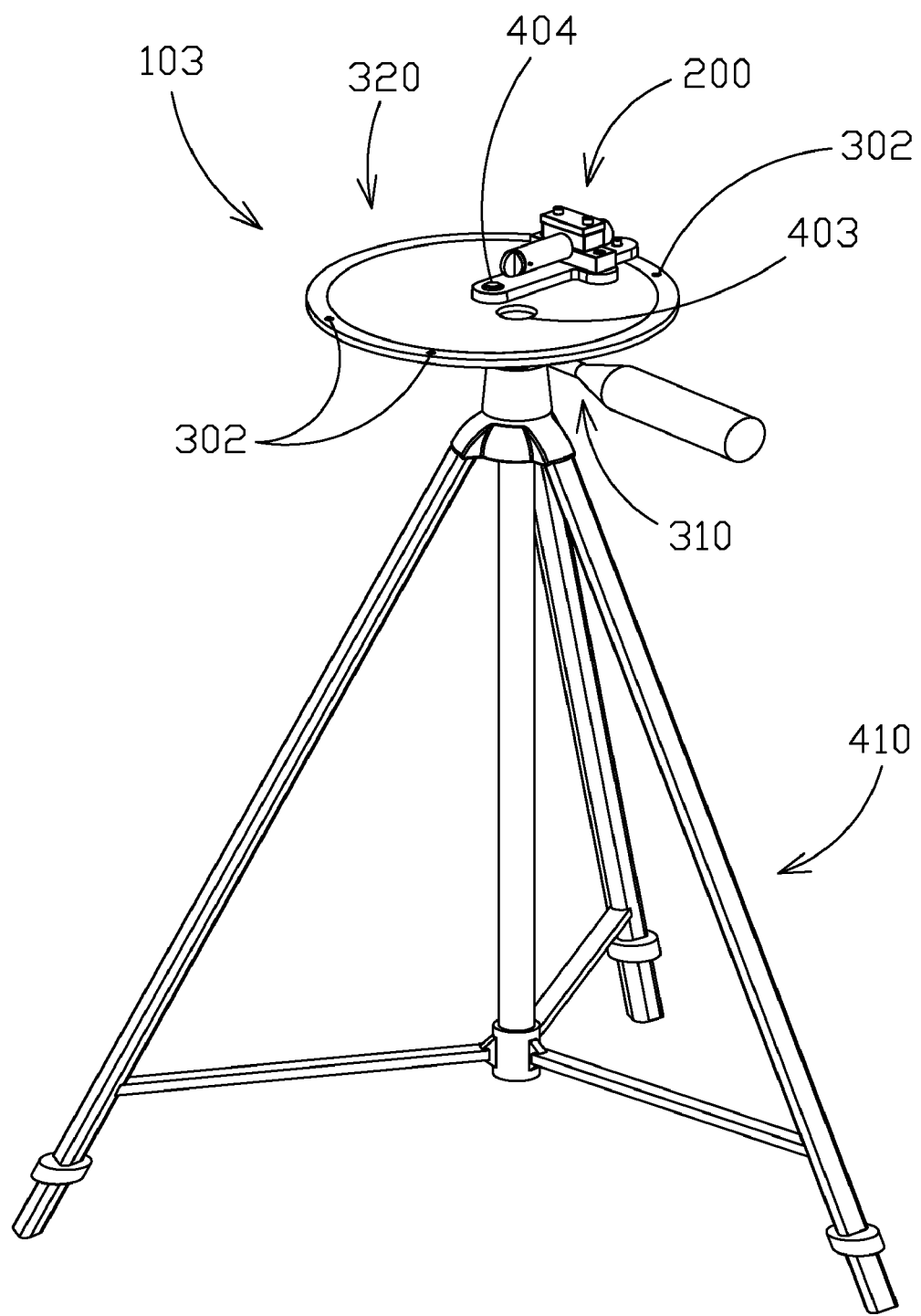
FIG. 9 is a perspective view of an optional modification of plate and base assembly of FIGS. 3A and B.

As described in Exemplary Method and Apparatus Embodiment 1, base assembly 400 comprises fastening device 409 (with affixed plate 405) which is positioned about post 407 and rests on arms 408 such that post 404 and level 403 may project through apertures in plate 405. Plate assembly 300 is placed on plate 405, creating a two-plate apparatus. One option, as is illustrated in FIG. 9, is to combine aspects of both exemplary embodiments to produce a single-plate apparatus. For example, base assembly 410 is similar to base assembly 400 described in Exemplary Method and Apparatus Embodiment 1; however, in this example plate 405 and fastening device 409 are omitted. Plate assembly 320 includes aspects of both plate assembly 300 (e.g. apertures 302 and label 800) and plate 405 (e.g. apertures for post 404 and level 403). Fastening device 310 may be affixed to plate assembly 320 (using apparatus and methods described in Exemplary Method and Apparatus Embodiment 2) and the resulting assembly affixed to base assembly 410.

What is claimed is:

1. An apparatus for translating one or more plan points on a scale-model plan of an area each to a correlated actual geographic location in the area comprising:
   a. a portable base comprising:
      i. a mounting interface;
      ii. one or more ground-contacting feet;
      iii. an intermediate section between the mounting interface and the one or more ground-contacting feet;
   b. a working head mountable to the mounting interface of the base, the working head being adjustable angularly and rotationally relative the mounting interface;
   c. a surface on the working head adapted to display a scale-model plan comprising one or more plan points, a plan reference point, and a plan reference direction extending radially from the plan reference point.

2. The apparatus of claim 1 wherein the portable base comprises a camera tripod.

3. The apparatus of claim 1 wherein the working head comprises a joint allowing panning and tilting of the working head relative to the mounting interface.

4. The apparatus of claim 1 wherein the surface comprises a plate which is rotatable relative the working head.

5. The apparatus of claim 4 wherein the plate comprises mounting structure for a laser assembly.

6. The apparatus of claim 5 wherein the laser assembly comprises:
   a. a hand-held, battery-powered, low-power laser pointer removably held in a retainer which is mountable to the mounting structure of the plate.

7. The apparatus of claim 6 wherein the laser pointer comprises a less than 5 mW laser and an optical device produce a laser beam that is spread diverging in essentially a single plane.

8. The apparatus of claim 1 wherein the plan is integrated with the surface.

9. The apparatus of claim 8 wherein the plan is etched, inked, or painted on the surface.

10. The apparatus of claim 1 wherein the plan is independent of the surface but mountable to the surface.

11. A kit for locating as plurality of physical locations around a large area correlated to corresponding plan point on a scale-model plan comprising:
   a. a scale-model plan comprising:
      i. a plan reference point;
      ii. a plan radial reference direction from the plan reference point;
      iii. a plurality of plan points in pre-determined directions and distances from the plan reference point;
   b. a portable base that may be hand-carried to the area and positioned at an actual reference location correlated to the plan reference point of the plan;
   c. a laser assembly mountable on the portable base and adjusted to project a laser beam along an actual radial reference direction correlated to the plan radial reference direction of the plan within an acceptable tolerance;
   d. a portable distance measuring device that may be hand-carried with the portable base to the area and used to measure distance between the actual reference location and an actual location for a plan point by reference to the plan within an acceptable tolerance.

12. The kit of claim 11 further comprising a head between the laser assembly and the base, the head comprising a plate including a mounting location for the laser assembly.

13. The kit of claim 12 wherein the plate comprises a plate reference point correlated to the plan reference point and a plurality of pre-manufactured mounting locations for the laser assembly correlated to one or more plan points.

14. The kit of claim 13 further comprising a bubble level for the plate.

15. The kit of claim 13 wherein the laser assembly comprises a hand-held, battery-powered laser pointer device having a longitudinal axis and including an optic to spread the laser beam essentially in a single plane, and a mounting sub-assembly allowing rotation of the laser pointer device relative the plate reference point.

* * * * *

UNITED STATES PATENT AND TRADEMARK OFFICE
CERTIFICATE OF CORRECTION

| | |
|---|---|
| PATENT NO. | : 8,405,485 B2 |
| APPLICATION NO. | : 12/603060 |
| DATED | : March 26, 2013 |
| INVENTOR(S) | : David L. Barker et al. |

It is certified that error appears in the above-identified patent and that said Letters Patent is hereby corrected as shown below:

In the Claims:

Column 16, Claim 7, Line 31:
ADD after device --to--

Column 16, Claim 11, Line 41:
DELETE after locating "as"
ADD after locating --a--

Signed and Sealed this
Fourteenth Day of May, 2013

Teresa Stanek Rea
*Acting Director of the United States Patent and Trademark Office*